(12) United States Patent
Louarn et al.

(10) Patent No.: US 12,555,551 B2
(45) Date of Patent: Feb. 17, 2026

(54) APPARATUS AND METHODS FOR ADJUSTING DIGITAL IMAGES

(71) Applicants: BARCO N.V., Kortrijk (BE); BARCO VISUALS SOLUTIONS, INC., Vancouver (CA)

(72) Inventors: Amaury Louarn, Vancouver (CA); Ronan Boitard, Vancouver (CA)

(73) Assignees: BARCO N.V., Kortrik (BE); BARCO VISUAL SOLUTIONS, INC., Vancouver (CA)

( * ) Notice: Subject to any disclaimer, the term of this patent is extended or adjusted under 35 U.S.C. 154(b) by 0 days.

(21) Appl. No.: 18/839,989

(22) PCT Filed: Feb. 21, 2023

(86) PCT No.: PCT/EP2023/054338
§ 371 (c)(1),
(2) Date: Aug. 20, 2024

(87) PCT Pub. No.: WO2023/161237
PCT Pub. Date: Aug. 31, 2023

(65) Prior Publication Data
US 2025/0182715 A1    Jun. 5, 2025

Related U.S. Application Data

(60) Provisional application No. 63/268,368, filed on Feb. 22, 2022.

(51) Int. Cl.
*G09G 5/02* (2006.01)
*G06T 5/92* (2024.01)
(Continued)

(52) U.S. Cl.
CPC .............. *G09G 5/02* (2013.01); *G06T 5/92* (2024.01); *H04N 1/60* (2013.01); *H04N 9/646* (2013.01);
(Continued)

(58) Field of Classification Search
CPC ............ G09G 5/02; G09G 2320/0242; G09G 2320/0626; G09G 2320/0666; G06T 5/92; H04N 1/60; H04N 9/646
See application file for complete search history.

(56) References Cited

U.S. PATENT DOCUMENTS

2019/0311694 A1\* 10/2019 Van Mourik ............ H04N 9/67

FOREIGN PATENT DOCUMENTS

DE    102006005078 A1    8/2007
EP        3486893 A1    5/2019
(Continued)

OTHER PUBLICATIONS

Leirpoll, Jarie, The Complete Guide to Premiere Pro Color Correction, May 2018, hereinafter "Leirpoll" (Year: 2018).\*
(Continued)

*Primary Examiner* — Robert J Michaud
(74) *Attorney, Agent, or Firm* — HSML P.C.

(57) ABSTRACT

Apparatus and methods for colour grading may be implemented to improve the efficiency of colour grading digital content. Features of the apparatus and methods include: automatic detection of differences between image data and rendered images, automatic suggestions for colour grading, detection and communication of temporal effects, guidance for selecting an order of frames for grading, automated QC processes, and/or reference monitor emulation.

22 Claims, 10 Drawing Sheets

(51) Int. Cl.
*H04N 1/60* (2006.01)
*H04N 9/64* (2023.01)
(52) U.S. Cl.
CPC ............... *G09G 2320/0242* (2013.01); *G09G 2320/0626* (2013.01); *G09G 2320/0666* (2013.01)

(56) References Cited

FOREIGN PATENT DOCUMENTS

| | | |
|---|---|---|
| WO | 2015054797 A1 | 4/2015 |
| WO | 2015172236 A1 | 11/2015 |
| WO | 2015184549 A1 | 12/2015 |
| WO | 2016015163 A1 | 2/2016 |
| WO | 2017059537 A1 | 4/2017 |
| WO | 2018205036 A1 | 11/2018 |

OTHER PUBLICATIONS

International Search Report and Written Opinion issued in PCT/EP2023/054338, dated May 17, 2023.

Leirpoll Jarle, "The Complete Guide to Premiere Color Correction Using Lumetri", Jun. 1, 2019 Retrieved from the Internet: URL:https://blog.frame.io/2018/05/21/guide-to-lumetri-color-correction-premiere-pro/ XP055972048, retrieved on Oct. 17, 2022, pp. 19-22.

Kwak et al., Method for characterizing an LCD projection display Photonics West 2001—Electronic Imaging, 2001, San Jose, CA, United States, Proceedings vol. 4294, Projection Displays VII; Mar. 30, 2001.

Damberg et al., Light Steering Projection Systems and Attributes for HDR Displays SID 2017 International Symposium, vol. 48, Issue 1, First published Jun. 2, 2017, pp. 87-90, https://doi.org/10.1002/sdtp.11574.

Forchhammer et al., HDR Display Characterization and Modeling—Chapter 13 of High Dynamic Range Video—From Acquisition to Display and Applications Academic Press, 2016, pp. 347-369.

Kwak et al., Method for characterizing an LCD projection display Photonics West 2001—Electronic Imaging, 2001, San Jose, CA, United States, Proceedings vol. 4294, Projection Displays VII; Mar. 30, 2001, 10 pages provided.

\* cited by examiner

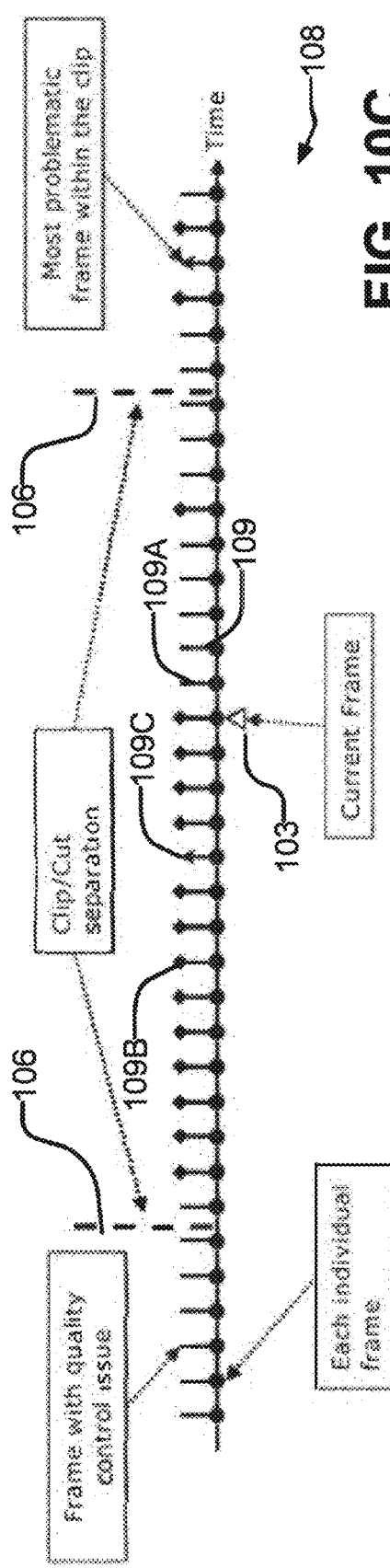
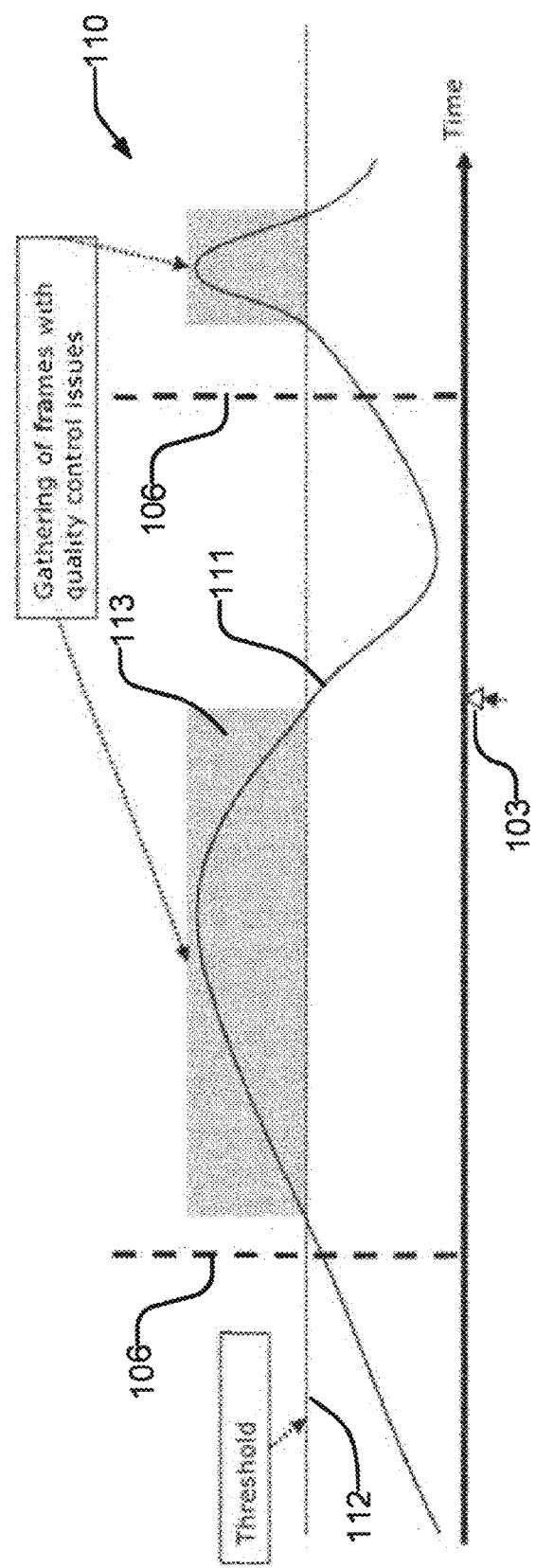

APPARATUS AND METHODS FOR ADJUSTING DIGITAL IMAGES

FIELD

The present technology relates to adjusting digital images. Example implementations provide tools for colour grading of content such as movies, video and other digital images.

BACKGROUND

An important step in the production of visual digital content (e.g. movies, videos, digital images) is colour grading. Colour grading is a process in which a colourist (person) views digital content on a reference monitor. The colourist adjusts the digital content (e.g. by altering colours and/or light levels of pixels) using a grading workstation. The grading workstation is typically provided by a computer workstation that runs computer software which provides controls that the colourist can use to adjust the digital content. When the colour grading is complete the digital content is saved as a "reference master". Copies of the content for distribution may be derived from the reference master and delivered to end-users for viewing.

Different reference masters may be required for different distribution channels. For example, different reference masters may be provided for viewing in movie theaters and home viewing. The different reference masters may differ in their colour grading, aspect ratio, image data formatting, digital resolution, colour space and/or other factors. In some cases different reference masters are provided for different projector types (e.g. projectors from different projector makers, etc.).

There is a need for new tools that can facilitate colour grading of digital content in ways that are more efficient, capable of producing improved results and/or facilitate colour grading in a way that is better informed.

SUMMARY

The present invention has various aspects that include, without limitation:
  methods and apparatus for colour grading of digital images;
  colour grading suites; and
  methods and apparatus for generating reference masters for digital content;
  methods and apparatus for automation of colour grading steps;
  methods and apparatus for quality control of digital content.

The following are non-limiting example aspects of the present technology.

One aspect of the present technology provides apparatus comprising: an input system operative to receive image data for display on a reference monitor; a data processor configured to process image data received at the first input to identify differences between an image specified by the image data and a rendering of the image by the reference monitor and to generate difference data representing the differences; and an output system operative to present the difference data.

In some embodiments the input system is operative to receive from the reference monitor an amplitude signal and the data processor is configured to process the amplitude signal to identify pixels of the image data that are clipped and/or crushed in the rendering of the image by the reference monitor.

In some embodiments the data processor is configured to compute a simulated amplitude signal of the reference monitor and to process the simulated amplitude signal to identify pixels of the image data that are clipped and/or crushed in the rendering of the image by the reference monitor.

In some embodiments the data processor is configured to compare the image data to performance characteristics of the reference display which define a performance envelope and to determine the difference by identifying pixels of the image data that have pixel values outside of the performance envelope of the reference monitor.

In some embodiments the data processor is configured to simulate operation of the reference monitor to render the image data to yield simulated rendered image data and to identify the differences by comparing the image data to the simulated rendered image data.

In some embodiments, in simulating operation of the reference monitor the processor is configured to simulate one or more or all of:
  a maximum luminance of individual pixels of the reference monitor;
  a dark level of individual pixels of the reference monitor;
  processing on the image data performed by the reference monitor;
  operation of a power supply of the reference monitor;
  thermal management of the reference monitor;
  local contrast of the reference monitor;
  rate of change of luminance of the reference monitor;
  a light steering component of the reference monitor.

In some embodiments the differences include clipping and/or crushing by the reference monitor.

In some embodiments the apparatus is operative to output the simulated rendered data.

In some embodiments the apparatus is operative to store the simulated rendered data.

In some embodiments the apparatus is configured to display the difference data.

In some embodiments the apparatus is configured to display the difference data as an image that indicates locations of pixels that are different from the image specified by the image data in the rendering of the image by the reference monitor.

In some embodiments the apparatus is configured to display the difference data as numerical and/or graphical indicator showing a number of pixels that are different from the image specified by the image data in the rendering of the image by the reference monitor.

In some embodiments the indicator indicates a number of clipped pixels relative to a clipping number threshold.

In some embodiments the indicator indicates a number of clipped pixels for which the clipping exceeds a clipping magnitude threshold.

In some embodiments the apparatus is integrated with the reference monitor.

In some embodiments the apparatus is integrated with a colour grading console.

In some embodiments the apparatus is combined with the reference monitor and a colour grading console and the colour grading console is connected to supply the image data to an input of the reference monitor and the input system of the apparatus.

In some embodiments the colour grading console is configured to display a representation of the difference data on a user interface of the colour grading console.

In some embodiments the data processor is configured to identify the differences between the image specified by the image data and the rendering of the image by the reference monitor for each of a plurality of colour channels.

In some embodiments the data processor is configured to either simultaneously or at different times: simulate operation of one or more other monitors that are different from the reference monitor to render the image data and to yield simulated rendered image data for each of the one or more other monitors; and output the simulated rendered image data for one of the one or more other monitors for display on the reference monitor.

In some embodiments, in simulating operation of one of the one or more other monitors the processor is configured to simulate one or more or all of:
- a maximum luminance of individual pixels of the other monitor;
- a dark level of individual pixels of the other monitor;
- processing on the image data performed by the other monitor;
- operation of a power supply of the other monitor;
- thermal management of the other monitor;
- local contrast of the other monitor;
- rate of change of luminance of the other monitor;
- a light steering component of the other monitor.

In some embodiments the apparatus comprises a data analyzer that is configured to process the image data to collect data regarding each frame of a set of frames defined by the image data and a database connected to store the collected data.

In some embodiments items of the collected data are associated with the frame from which the items of collected data were respectively collected.

In some embodiments items of the collected data are associated in the database with scenes or clips of the image data.

In some embodiments the collected data includes one or more of:
- min, max, mean and median value of each color channel separately;
- min, max, mean and median value of a measure of brightness;
- maxRGB;
- percentage or number of pixels clipped and pixels crushed;
- proportion of light budget required on a per-colour channel basis
- proportion of light budget required on a total basis;
- flags or counters that indicate the presence of defects;
- image histograms; and
- noise level.

In some embodiments the data analyzer is integrated with the data processor.

In some embodiments the apparatus is configured to any one or any combination of two or more of:
- detect temporal effects such as flicker in one or more colour channels;
- automatically identify frames that warrant priority attention by a colourist;
- generate and display graphical indicators that show how selected statistics vary temporally in content corresponding to the image data;
- compute statistics over a clip, shot or scene;
- compare statistics for different frames;
- calculate and/or compare average statistics for different sets of frames;
- detect clips;
- associate clips corresponding to similar visual stimulus In some embodiments the apparatus is further configured to present a display indicating the temporal effects.

In some embodiments the apparatus is configured to store in the database flags of one or more types that indicate flagged frames and the apparatus provides a control operable to jump to flagged frames of a selected type of the one or more types.

In some embodiments the flags include priority flags that indicate frames that should be prioritized for a colourist's attention.

In some embodiments the priority flags indicate frames that have been identified as having the greatest numbers of clipped pixels in individual clips. In some embodiments the priority flags indicate frames that have been identified as having the greatest numbers of clipped pixels in individual clips for which a magnitude of the clipping exceeds a threshold clipping magnitude.

In some embodiments the database includes a sort function that allows a set of frames which is the result of a search of the database to be sorted in a desired order.

In some embodiments the apparatus comprises controls that invoke the search and sort functions to do one or more of:
- identify N frames (N can be 1, 2, 3, . . . ) in each clip that have the greatest numbers of clipped pixels;
- identify N frames (N can be 1, 2, 3, . . . ) in each clip that have the greatest numbers of crushed pixels;
- identify frames that have suspected compression artefacts;
- identify frames that have dead pixels;
- identify frames that have suspected glint defects; and.
- identify frames that are similar to one another or similar to a currently selected frame.

In some embodiments the apparatus comprises controls operable by a user to jump between frames that have been identified as having the greatest numbers of clipped pixels in individual clips.

In some embodiments the apparatus comprises controls operable by a user to jump between and/or compare frames of the image data that have similar characteristics.

In some embodiments the apparatus comprises controls operable by a user to jump between frames of the image data that include defects.

In some embodiments the defects include one or more of dead pixels, glint defects, and compression artefacts.

In some embodiments the apparatus is configured to display metrics for a current frame of the image data and a range of other frames neighboring the current frame.

In some embodiments the apparatus is configured to compute and display high-level metrics aggregated from multiple frames In some embodiments the apparatus is configured to display a timeline that graphically shows the magnitude of one or more of the high-level metrics.

In some embodiments the apparatus is configured to suggest or automatically select a frame in each of plurality of clips of the image data for initial grading of the respective clip.

In some embodiments the apparatus is configured to generate a scaling factor or tone mapping parameter or tone mapping function that will bring clipped and/or crushed pixels in a frame within range.

In some embodiments the apparatus is configured to generate one or more scaling factors or tone mapping parameters or tone mapping functions selected to make two or more selected clips more consistent with one another.

In some embodiments the apparatus is configured to suggest key frames for grading dynamic behavior of the image data.

In some embodiments the apparatus is configured to automatically each of a plurality of frames defined by the image data for one or more QC issues and to generate and present a QC analysis.

In some embodiments the apparatus comprises a feature recognition module comprising a trained machine learning system that is trained to recognize filmmaking equipment in frames of the image data.

Another aspect of the present technology provides apparatus comprising: an input system operative to receive image data for display on a reference monitor; a data processor configured to simulate operation of one or more other monitors different from the reference monitors to render the image data and to yield simulated rendered image data for each of the one or more other monitors; and output the simulated rendered image data for one of the one or more other monitors for display on the reference monitor.

In some embodiments the data processor is configured to simulate operation of a plurality of the other monitors.

In some embodiments, in simulating operation of one of the one or more other monitors the processor is configured to simulate one or more or all of:
  a maximum luminance of individual pixels of the other monitor;
  a dark level of individual pixels of the other monitor;
  processing on the image data performed by the other monitor;
  operation of a power supply of the other monitor;
  thermal management of the other monitor;
  local contrast of the other monitor;
  rate of change of luminance of the other monitor;
  a light steering component of the other monitor.

Another aspect of the present technology provides apparatus comprising: an input system operative to receive image data for display on a reference monitor; a data processor configured to process image data received at the first input, a data analyzer that is configured to process the image data to collect data regarding each frame of a set of frames defined by the image data; a database connected to store the collected data and configured to associate items of the collected data with corresponding ones of the frames of the image data; an output system operative to.

In some embodiments items of the collected data are associated in the database with scenes or clips of the image data.

In some embodiments the collected data includes one or more of:
  min, max, mean and median value of each color channel separately;
  min, max, mean and median value of a measure of brightness;
  maxRGB;
  percentage or number of pixels clipped and pixels crushed;
  proportion of light budget required on a per-colour channel basis
  proportion of light budget required on a total basis;
  flags or counters that indicate the presence of defects;
  image histograms; and
  noise level.

In some embodiments the data analyzer is integrated with the data processor.

In some embodiments the apparatus is configured to any one or any combination of two or more of:
  detect temporal effects such as flicker in one or more colour channels;
  automatically identify frames that warrant priority attention by a colourist;
  generate and display graphical indicators that show how selected statistics vary temporally in content corresponding to the image data;
  compute statistics over a clip, shot or scene;
  compare statistics for different frames;
  calculate and/or compare average statistics for different sets of frames;
  detect clips;
  associate clips corresponding to similar visual stimulus In some embodiments the apparatus is further configured to present a display indicating the temporal effects.

In some embodiments he apparatus is configured to store in the database flags of one or more types that indicate flagged frames and the apparatus provides a control operable to jump to flagged frames of a selected type of the one or more types.

In some embodiments the flags include priority flags that indicate frames that should be prioritized for a colourist's attention.

In some embodiments the priority flags indicate frames that have been identified as having the greatest numbers of clipped pixels in individual clips.

In some embodiments the database includes a sort function that allows a set of frames which is the result of a search of the database to be sorted in a desired order.

In some embodiments the apparatus comprises controls that invoke the search and sort functions to do one or more of:
  identify N frames (N can be 1, 2, 3, . . . ) in each clip that have the greatest numbers of clipped pixels;
  identify N frames (N can be 1, 2, 3, . . . ) in each clip that have the greatest numbers of crushed pixels;
  identify frames that have suspected compression artefacts;
  identify frames that have dead pixels;
  identify frames that have suspected glint defects; and.
  identify frames that are similar to one another or similar to a currently selected frame.

In some embodiments the apparatus comprises controls operable by a user to jump between frames that have been identified as having the greatest numbers of clipped pixels in individual clips.

In some embodiments the apparatus comprises controls operable by a user to jump between and/or compare frames of the image data that have similar characteristics.

In some embodiments the apparatus comprises controls operable by a user to jump between frames of the image data that include defects.

In some embodiments t the defects include one or more of dead pixels, glint defects, and compression artefacts.

In some embodiments the apparatus is configured to display metrics for a current frame of the image data and a range of other frames neighboring the current frame.

In some embodiments the apparatus is configured to compute and display high-level metrics aggregated from multiple frames In some embodiments the apparatus is configured to display a timeline that graphically shows the magnitude of one or more of the high-level metrics.

Another aspect of the present technology provides apparatus comprising: an input system operative to receive image data for display on a reference monitor; a data processor configured to process frames of image data received at the first input to suggest or automatically select a frame in each of plurality of clips of the image data for initial grading of the respective clip; an output system operative to output an indication of the suggested or selected frames to a user interface.

In some embodiments the data processor is configured to generate a scaling factor or tone mapping parameter or tone mapping function that will bring clipped and/or crushed pixels in the suggested or selected frames within range.

Another aspect of the present technology provides apparatus comprising: an input system operative to receive image data for display on a reference monitor; a data processor configured to process image data received at the input; a feature recognition module comprising a machine learning system that is trained to recognize filmmaking equipment in frames of the image data and to tag the frames in which filmmaking equipment is recognized; an output system operative to output identification of the tagged frames.

In some embodiments the apparatus is configured to generate one or more scaling factors or tone mapping parameters or tone mapping functions selected to make two or more selected clips more consistent with one another.

In some embodiments the apparatus is configured to suggest key frames for grading dynamic behavior of the image data.

K Another aspect of the present technology provides a computer program product comprising a tangible medium storing machine readable, machine executable instructions that, when executed by a data processor cause the data processor to execute a method performed by any of the apparatus as described herein.

K Another aspect of the present technology provides a colour grading suite comprising apparatus as described herein.

K Another aspect of the present technology provides apparatus having any new and inventive feature, combination of features, or sub-combination of features as described herein.

K Another aspect of the present technology provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIGS. 10A to 10D are example displays that may be provided in the present technology for communicating temporal information.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
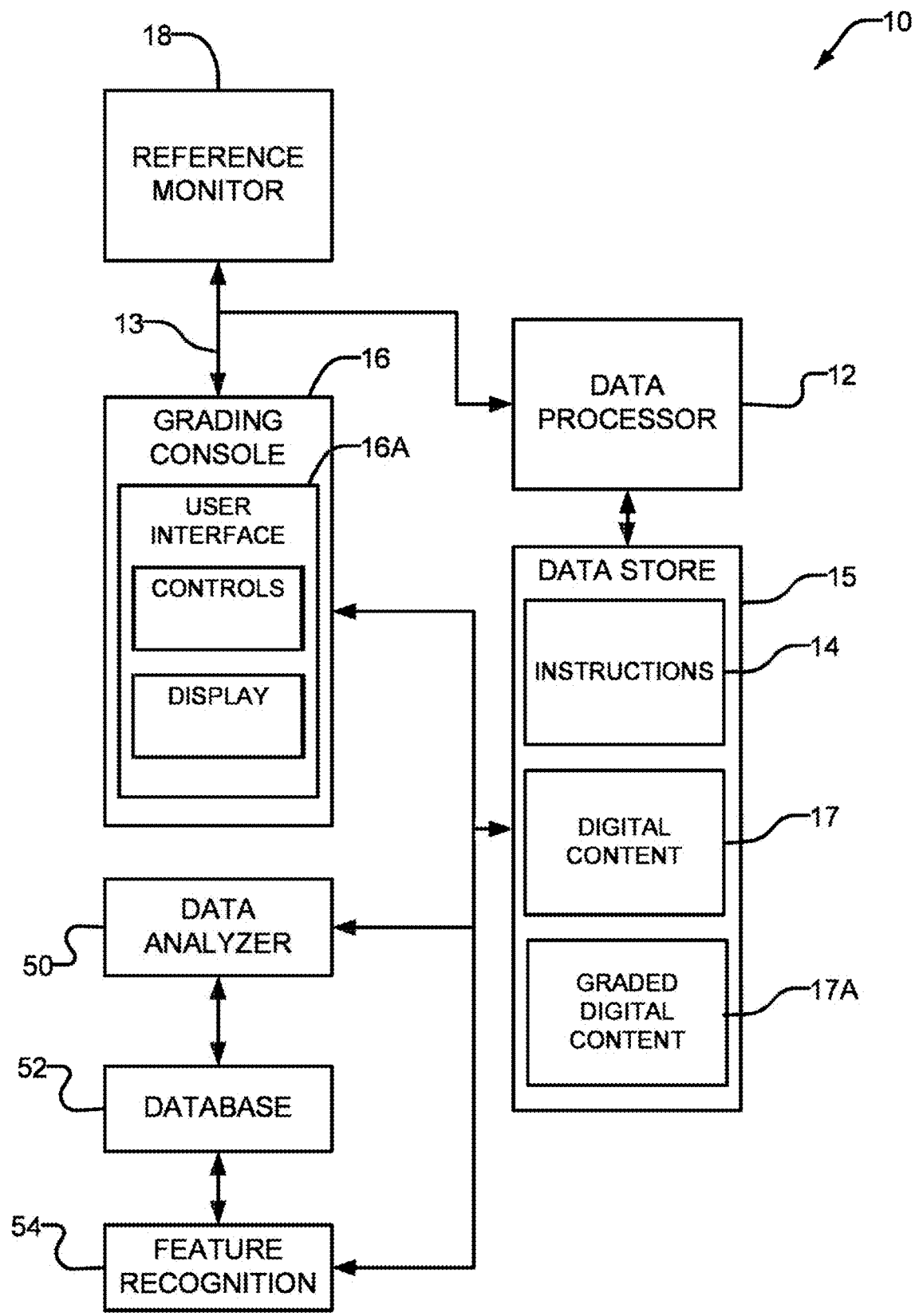
FIG. 1 is a functional block diagram showing example apparatus according to an example implementation of a present technology.

FIG. 1 shows an example apparatus 10 which includes features for facilitating colour grading of digital content. Apparatus 10 includes a data processor 12 that is configured to perform methods and/or provide controls as described herein. For example, data processor 12 may be configured by computer executable instructions 14 in a data store 15 accessible to data processor 12 to perform such methods and/or provide such controls.

Data processor 12 is not limited to being a single discrete device. The functions of data processor 12 may be distributed over plural devices (e.g. plural microprocessors, plural cores etc.). Data processor 12 may, for example, be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these.

Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors ("GPUs"), math co-processors, general purpose computers, server computers, graphics workstations, cloud computers, mainframe computers, and the like. Data processor 12 is not necessarily dedicated exclusively to the functions described herein but may also be configured to execute other functions. In some embodiments an output of data processor 12 is connected directly to an input of a reference monitor, projector system and/or the like.

Apparatus 10 includes a colour grading console 16 that provides a user interface 16A by way of which a user (e.g. a colourist) can perform one or more of: control viewing of digital content 17 on a connected reference monitor 18; access and control tools which allow the user to alter pixel values of digital content 17 to yield graded digital content 17A; access and control tools which perform certain automated processing of and/or perform analyses of digital content 17 and/or graded digital content 17A and present those to the user.

User interface 16A may include physical controls (e.g. switches, sliders, knobs) and/or software defined controls (e.g. controls provided by a graphical interface of colour grading console 16).

Figure 2:
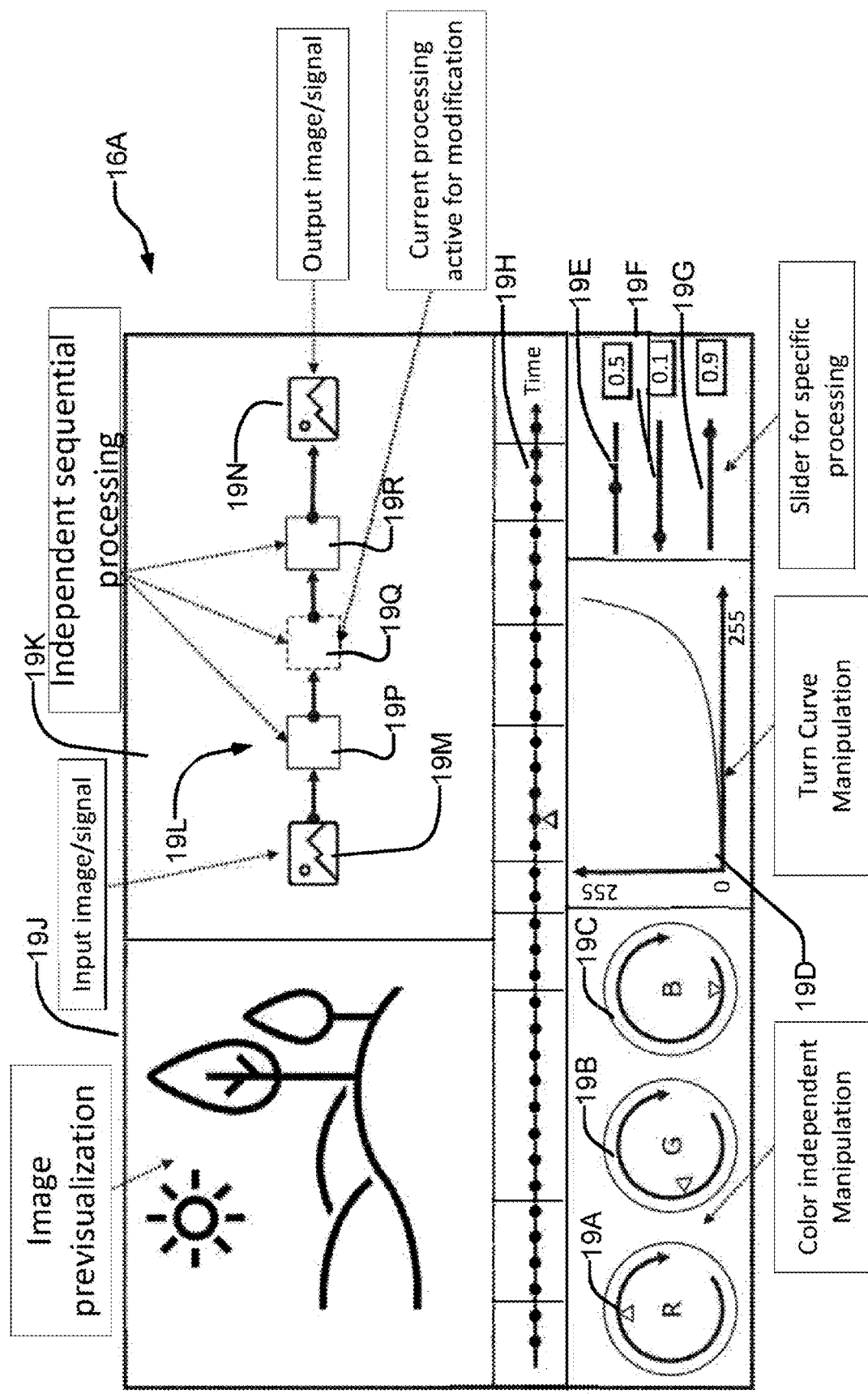
FIG. 2 shows an example layout of a portion of a user interface that may be included in apparatus according to the present technology.

FIG. 2 shows an example user interface 16A for a grading console 16. User interface 16A may be displayed on a display of grading console 16. User interface 16A includes: controls 19A, 19B and 19C which respectively allow adjustment of levels of corresponding primary colours; a control 19D that allows a user to manipulate a tone curve that relates input pixel values to output pixel values; sliders 19E, 19F and 19G that may be assigned for specific processing; a timeline 19H that indicates clips in content being processed and which may be used to select frames (different clips may, for example, be visually separated by vertical lines as shown in FIG. 2), clips or other parts of the content to operate on; a preview image area 19J; and a processing definition diagram and control 19K which allows a user to select and modify operation of processes in a sequence of processes that produce an output image signal from an input image signal. For example a user may define a chain 19L of processing operations by dragging, dropping and connecting blocks that indicate processing operations. In FIG. 2, chain 19L starts with a block 19M representing input image data (e.g. digital content 17) and ends with a block 19N representing output image data (e.g. graded digital content 17A). The illustrated example processing chain 19L includes processing blocks 19P, 19Q and 19R. Processing blocks may be selected (e.g. by touch, pointing device, etc.) to adjust their operation e.g. by setting available processing parameters.

Timeline 19H shown in FIG. 2 is an example for illustrative purposes. Each clip may comprise many more frames than what is illustrated in FIG. 2.

Data processor 12 may be integrated with grading console 16, reference monitor 18, and/or another device or may be provided in the form of a stand alone unit that is in data communication with colour grading console 16 and reference monitor 18 or may be provided in the form of a configured cloud computing resource.

Typical Workflow for Colour Grading

To achieve the desired rendering/artistic intent on-screen, the colourist uses a grading workstation (e.g. colour grading console 16) to modify the video signal transmitted to a reference display (e.g. reference monitor 18) by adjusting the color and light levels of the content (e.g. digital content 17) in question.

A typical task for a colourist is to adjust colours and lightness of an item of video content such as a movie. The video content includes a large number of frames, each of which is a separate image.

Typical video content includes multiple "clips" (also known as "shots" or "cuts"). A clip is a set of temporally neighboring frames where no scene change occurs. A colourist typically performs colour grading for each clip. For example, the colourist may use controls provided by user interface 16A of colour grading console 16 to apply tone mapping to all pixels in a clip to raise or lower lightness of the image data and/or to adjust colour balance for the clip.

Colour grading tends to be a repetitive process. Most of the time, multiple tweaks and iterations are required to achieve a desired result. Adjustments of pixel values in one clip may solve issues in some frames of the clip but not others or may solve issues in some frames of the clip and create new issues in other frames of the clip. For example, at the beginning of grading, the images need to be properly exposed for the current display before doing more detailed grading processes. Often this process is performed for the first frame of a clip until a satisfactory rendering is achieved. However, when reviewing the full clip, other frames can still be problematic with the initial choice and thus the same process is performed again which can be quite time consuming.

Also, it may be desirable to make similar adjustment to different frames depicting similar scenes (e.g. similar or identical colour grading may be applied to the frames which depict an identical or similar scene).

Also, the entire item of content needs to fit together. Even if all clips have been adjusted in a way that is satisfactory, further adjustments may be required to achieve a desired artistic effect for the entire item of content. Colour grading an item of content can therefore be very time consuming.

When colour grading has been completed items of content may be reviewed in a quality control process. As part of Quality Control (QC) artistic and technical teams review the content to detect issues with colour grading as well as issues with other aspects of the content. If the QC fails, the post-production process is reiterated upon until full compliance. If the content passes the QC process (i.e. the colour graded content is considered to be acceptable) the colour graded image content is delivered and/or stored as a reference master for distribution to end-users.

Figure 3:
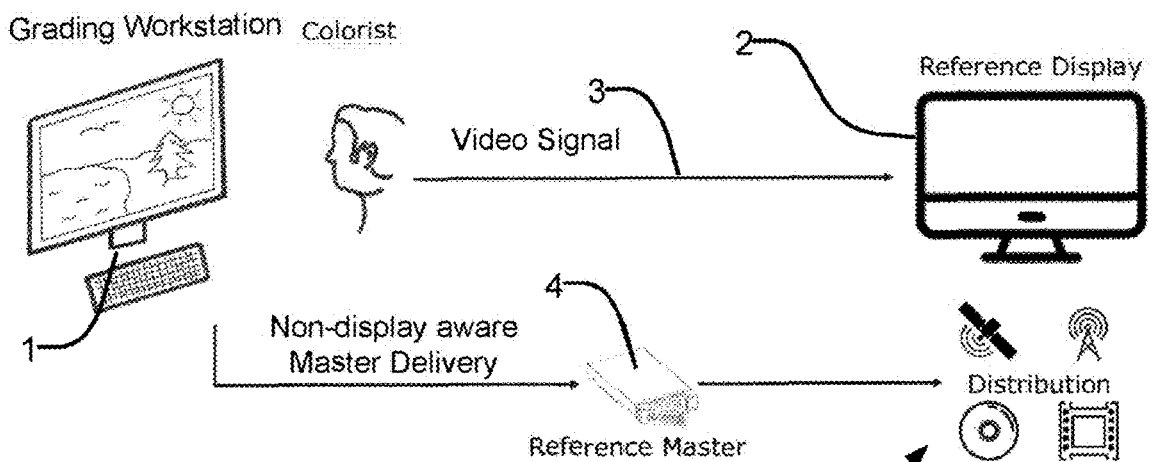
FIG. 3 is a schematic illustration of prior art apparatus for colour grading.

FIG. 3 illustrates a typical prior art colour grading setup that incorporates a colour grading workstation 1 and a reference monitor 2. A colourist operates grading workstation 1 to modify content (not shown in FIG. 3) to achieve a desired effect. Workstation 1 outputs a video signal 3 that is rendered by reference monitor 2. When the colourist is satisfied with the modified (graded) content the colourist may control colour grading workstation 1 to output or deliver a reference master 4 which may be used to generate various distribution formats 5.

As mentioned above, the inventors have identified a number of problems with existing colour grading tools and methods. Apparatus 10 may include features as described herein for addressing any of these problems, all of these problems or any combination of these problems. For example, apparatus 10 may include features as described herein that address one or more of the following problems:

Reference monitor 18 may not faithfully represent image data (e.g. as a result of clipping and/or crushing) so that the image data may not have a desired appearance (e.g. the appearance as viewed on reference monitor 18) when viewed on a display that is not the same as reference monitor 18.

It may be desirable to colour grade content for viewing on a particular display that is "expensive" to access or use (e.g. a high end cinema projector).

It may be desirable to colour grade content for viewing on multiple types of display. However providing multiple different reference monitors requires a lot of space and expense.

It may be desirable to colour grade content for viewing on a range of different display types that each have different characteristics and/or are expected to be used under different conditions of ambient light. However this can require repeating the entire colour grading process using different types of reference monitor, which is expensive and time consuming.

It is time consuming and requires a lot of skill for a colourist to: determine an efficient sequence for colour grading, particularly on larger items of content, such as full length movies, and to identify and correct temporal effects such as flicker.

It is inefficient when quality control processes detect issues that were not noticed during colour grading.

Current colour grading methodologies require multiple manual interventions by a colourist, which makes colour grading time consuming and expensive.

The following sections describe technologies that may be incorporated in apparatus and methods as described herein. These technologies may be applied individually, all together or in any combinations. Use of these technologies may facilitate more efficient and/or more accurate colour grading.

Clipping/Crushing

Apparatus 10 may include tools that address the problem that the light output by individual pixels displayed by reference monitor 18 may have luminance that is different from a luminance specified by image data being supplied to reference monitor 18.

"Clipping" refers to the case where a luminance of a pixel provided by a display is less than a luminance specified by image data.

Clipping may occur for individual primary colours produced by reference monitor 18 (e.g. for R, G, and B channels of reference monitor 18). Clipping may, for example, occur where the image data specifies an intensity for a pixel that is higher than a maximum intensity of reference monitor 18.

Undetected clipping or crushing can be a problem because a reference master comprising image data that has a desired appearance when viewed on reference monitor 18 may have a different (undesired) appearance when viewed on a different display. Therefore, where pixels are clipped or crushed by reference monitor 18 cross-compatibility of the graded content with other displays is not ensured. Indeed, visual elements or artifacts which have been tone mapped or clipped by the reference display might not be on another display thus becoming visible. It is fundamental that the delivered signal reflects what the creative team validated on screen to enable cross-compatibility.

Clipping by reference monitor 18 may occur by any of or any combination of a variety of mechanisms. These include:
- individual pixels of reference monitor 18 have a maximum luminance (which may be different for each colour channel of a pixel where clipping occurs) and the image data specifies a luminance in excess of the maximum luminance;
- reference monitor 18 performs processing on incoming image data that includes tone-mapping, and/or soft or hard clipping;
- reference monitor 18 has a power supply that has a maximum output power level that is insufficient for driving all pixels at a maximum intensity and the image data defines an image that would require more power than the maximum output power level of the power supply;
- reference monitor 18 has a thermal constraint that limits how much light is output within a local area of the display to an average level that is insufficient for driving all pixels within this area at a maximum intensity and the image data defines an image that would require more light in this area than the local maximum average light level;
- reference monitor 18 has a limited local contrast that is insufficient to render two neighboring pixels where, for example, the first one of the pixels requires a very high luminance and the second pixel requires a very low luminance;
- reference monitor 18 has a temporal constraint that limits the reference monitor's ability from varying luminance of a pixel sufficiently quickly; and.
- reference monitor 18 includes a light steering component and the incoming image data defines an image that exceeds a light budget of the light steering component.

For example, suppose that reference monitor 18 can accurately display image pixel values in the intensity range of A to B. If the image data includes pixel values of C with C>B then in the image displayed by reference monitor 18 pixel values of C may be effectively clipped to pixel values not exceeding B (which is the maximum that reference monitor 18 can display). If the image data of the reference master is subsequently displayed on a display capable of displaying pixel values greater than B then the displayed image will not have the intended appearance.

"Crushing" occurs when a luminance of a pixel provided by a display is greater than a luminance specified by image data. For example many displays have a "black level" which is a minimum luminance that a pixel may have while the display is operating. Where such a display is used to display images which include pixels having values below the black level then the pixels below the black level are crushed.

As described above with respect to clipping, crushing may additionally or alternatively occur if reference monitor 18 has a limited local contrast that is insufficient to render two neighboring pixels where, for example, the first one of the pixels requires a very high luminance and the second pixel requires a very low luminance.

In some embodiments, reference monitor 18 generates an amplitude signal (or an amplitude signal per color channel) that can be directly interpreted to determine whether clipping or crushing is occurring. In some embodiments the amplitude signals are obtained from reference monitor 18 and processed to provide visual feedback regarding the numbers and/or locations of clipped and/or crushed pixels. The amplitude signals may, for example, control a final stage of spatial amplitude modulation in reference monitor 18.

For example, the amplitude signals may be numbers which have values that can be (or when scaled can be) in any of three ranges:
1. the unclipped amplitude signal is in the range of [0;1], in which case reference monitor 18 is not clipping or crushing;
2. the unclipped amplitude signal is below 0, in which case reference monitor 18 is crushing; and
3. The unclipped amplitude signal is above 1, in which case reference monitor 18 is clipping.

In some embodiments the operation of reference monitor 18 is simulated by data processor 12 to yield simulated unclipped amplitude signals which may be applied as described above to identify pixels that are clipped and/or pixels that are crushed. Details of the simulation will depend on the design and construction of reference monitor 18. Example features that a simulation may include for various designs of reference monitor 18 are described below.

Displays generally form images by driving light modulation devices that operate to yield modulated light fields.

Light modulation devices of different types exist. A light modulation device may, for example, selectively emit, block, or reflect light or modulate light by any combination of these. Example display architectures include architectures in which:

- Light provided by fixed uniform illumination is modulated by a light modulation device, the light modulation device is controlled by an amplitude signal to selectively block light on a pixel basis to yield an image defined by image data.
- Light provided by a variable uniform illumination is modulated by a light modulation device, the level of the illumination may be changed from time to time (e.g. for each frame or each clip), the light modulation device is controlled by an amplitude signal to selectively block light on a pixel basis to yield an image defined by image data.
- Dual-modulation architectures in which a first light modulation device generates a spatially modulated light field which is further modulated by a second light modulation device. Dual-modulation can enable backlight illumination to be controlled on a local basis. Rendering an image on a dual modulation type of display usually results from a combination of a backlight signal (usually a low-resolution signal) that controls the light field provided by the first light modulation device and an amplitude signal that controls the second light modulation device to block extra light that is not needed to form the image. A dual modulation display typically processes image data to yield the backlight and amplitude signals.
- Direct-view architectures in which light is emitted at the pixel level (OLED displays are an example).

Example of display technologies where clipping and crushing can happen include:

- All displays have a peak luminance which is the maximum light intensity that a pixel can reach. If the input code value requires a light level above this peak luminance, clipping will occur.
- All displays have a minimum black level which is the lowest amount of light a display can emit while the display is operating. If the input code value requires a light level below this minimum black level, crushing will occur.
- Most displays (e.g. except for, for example, direct view displays) have a contrast limitation, which is the ability of blocking the light emitted by a backlight. If the local backlight illumination divided by the contrast is above the input code value, crushing will occur.
- RGBW displays (for example, some OLED displays are RGBW displays) have an additional characteristic that the peak luminance is higher for white than for individual colours, thus a peak luminance per colour is required to identify which pixels are not achievable.
- Displays that have many individual light sources (e.g. OLED displays or displays that have backlights with a large numbers of individually controllable light sources) may be limited to a maximum amount of light that can be produced over the whole screen area (may be referred to as the "light budget" of the display). If the sum of all pixels is above the light budget (fixed threshold), the display will not be able to produce the necessary light and thus clipping will occur.
- Dual modulation displays which use algorithms to produce every image. This algorithm typically computes two signals, a backlight illumination (which generates the light) and a light attenuation (amplitude) signal (which blocks the extra light at each pixel that is not needed to form the image). In such displays, crushing occurs when the amplitude signal is less than 0 (meaning that to achieve the correct image it is necessary to subtract more light than an amplitude modulator of the display is capable of attenuating). In such displays clipping occurs when the amplitude signal is greater than 1 (meaning that an amplitude modulator would need to output more light for a pixel than the light that is incident on the pixel, which is not possible).

In some embodiments, apparatus 10 is configured to detect and indicate clipping and/or crushing applied to the image displayed by reference monitor 18 on a pixel-by pixel basis and to provide visual feedback that indicates to a user of where clipped pixels occur in the displayed image. The visual feedback may, for example, comprise a map displayed on an interface of colour grading console 16 that shows how clipped pixels are distributed in the image being displayed by reference monitor 18 and/or an overlay that may be selectively displayed by reference monitor 18 that highlights locations of clipped pixels.

The visual feedback may provide separate clipping maps for different colour channels (e.g. R, G and B colour channels). In some cases two or more of the separate clipping maps for the different colour channels may be superimposed over one another. The maps may be superimposed automatically or by an operator (e.g. a colourist).

In some embodiments locations of clipped and/or crushed pixels are recorded and/or delivered as metadata for downstream processing. For example, such metadata may enable direct selection of the clipped and/or crushed pixels (e.g. use metadata as an alpha matte to directly select clipped and/or crushed pixels).

In some embodiments apparatus 10 is configured to detect and indicate clipping applied to the image displayed by reference monitor 18 on a pixel-by pixel basis and to provide visual feedback that indicates to a user a number of clipped pixels. The visual feedback may, for example, comprise a bar chart or gauge or numerical display that indicates a number of clipped pixels in the image being displayed by reference monitor 18. The bar chart or gauge may, for example be displayed on an interface of colour grading console 16. In some embodiments, the bar chart comprises a bar for each colour channel (e.g. R, G and B bars).

In some embodiments apparatus 10 is configured to identify a number of and/or locations of pixels that require more than a threshold amount of light to be properly displayed. Apparatus 10 may include a user control operable to adjust the threshold.

In some embodiments the number of clipped pixels in the image being displayed by reference monitor 18 may be determined by simulating the operation of reference monitor 18 using a computational model of reference monitor 18. The simulation may take into account the manner in which reference monitor 18 deals with pixel values that are out of range or close to being out of range. For example, reference monitor 18 may address out of range pixel values by:

- Hard clipping: only signal code values outside of the display capabilities is limited to the closest code value within the range of the display.
- Soft clipping: signal code values outside of the display capabilities but also signal code values at the edge of the display capabilities are processed (using a tone curve) to fit the capabilities of the display.
- Global Tone Mapping: every pixel is mapped using the same tone map such that no pixels or almost no pixels lie outside the capabilities of the display.

Local Tone Mapping: the decision to process a pixel depends on the context of each pixel. For example, the decision to perform tone mapping on a pixel may be made based on a spatial or temporal neighborhood of the pixel or on frequency characteristics of the pixel, etc. The resulting processing does not necessarily process all pixels in the same way or at all.

Figure 4:
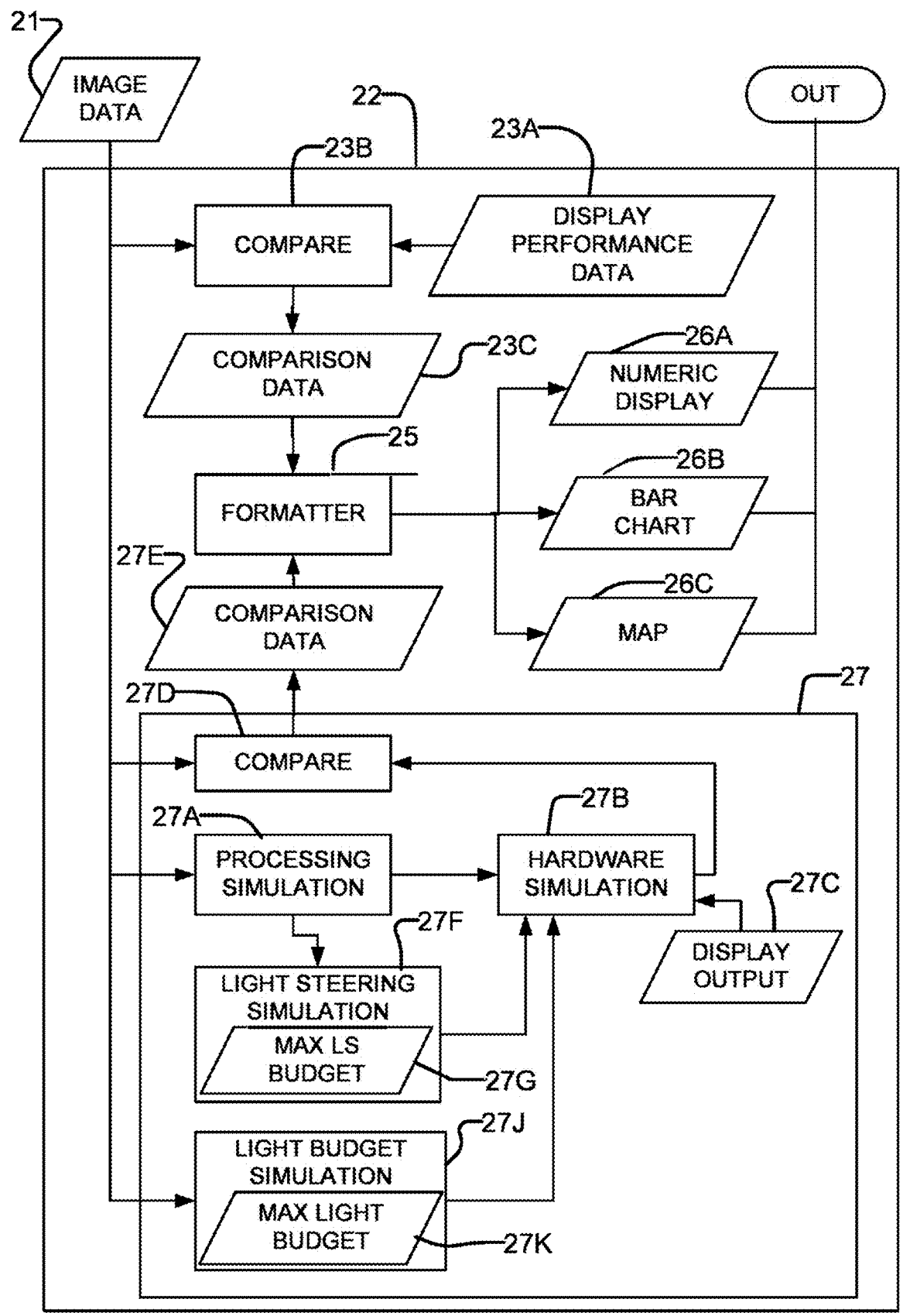
FIG. 4 is a functional block diagram illustrating apparatus for analyzing image data, identifying instances of clipping or crushing in a display of the image data on a reference monitor and communicating to a user the extent of the clipping/crushing.

FIG. 4 shows schematically a functional block diagram which illustrates a possible configuration of data processor 12 to analyze clipping and/or crushing. Image data 21 is provided both to data processor 12 and to reference monitor 18. Image data 21 may, for example, be image data output by colour grading console 16.

Image data 21 specifies colour and lightness for each pixel in an image using any suitable colour coordinate system. In some embodiments, image data 21 is RGB data. In some embodiments, image data 21 is non-compressed.

Image data 21 is input into a model 22 that emulates the operation of reference monitor 18. Techniques for modelling operation of displays are known and described for example in: S. Forchhammer, J. Korhonen, C. Mantel, X. Shu, X. Wu, *HDR Display Characterization and Modeling*—Chapter 13 of High Dynamic Range Video—From Acquisition to Display and Applications Academic Press 2016, Pages 347-369 and Youngshin Kwak, Lindsay William MacDonald, *Method for characterizing an LCD projection display* Photonics West 2001—Electronic Imaging, 2001, San Jose, CA, United States, Proceedings Volume 4294, Projection Displays VII; (2001) https://doi.org/10.1117/12.420780. Model 22 may implement such techniques as appropriate to model operation of reference monitor 18.

In the illustrated embodiment, model 22 includes data 23A that includes display performance values which include maximum light output (e.g. maximum luminance) for pixels of reference monitor 18 (which may, for example, be measured in "nits"—i.e. candelas per square meter).

Block 23B compares image data 21 to display performance values 23A and outputs data 23C that indicates any pixels that are clipped when image data 21 is displayed on reference monitor 18.

For example, if display performance data 23A indicates that reference monitor 18 has a maximum luminance then block 23 may flag any pixel for which image data 21 specifies a luminance for any colour channel that is more than the maximum luminance value for that colour channel specified by display performance data 23A. As an example case, if reference monitor 18 has a maximum luminance of about 300 nits for white light, reference monitor 18 may have a maximum luminance of about 75 nits for a red channel, 210 nits for a green channel and 15 nits for a blue channel.

Data 23C may, for example, comprise one or more of:
a number of clipped pixels;
a number of clipped pixels for each of plural colour channels;
an array or other data structure that indicates which pixels specified by image data 21 are clipped.

Block 25 formats data 23C for display, for example, as one or more of a numerical display 26A, a bar chart 26B, one or more maps 26C (i.e. a two dimensional display that includes marks to show locations of clipped pixels). In some embodiments model 22 generates a set of maps 26C that each shows locations of clipped pixels for a corresponding colour channel.

In FIG. 4, model 22 also includes a module 27 that simulates processing of image data 21 performed by reference monitor 18. Module 27 may, for example, include part 27A that simulates data processing including tone mapping, gamma correction, color space adjustment, clipping or soft clipping performed by reference monitor 18 on image data 21. Module 27 may also include a part 27B that simulates operation of hardware of reference monitor 18 (e.g. for given pixel values/control signals output by part 27A what is the luminance output by reference monitor 18).

In some embodiments module 27 includes or accesses display output data 27C which correlates pixel values to pixel luminance of reference monitor 18. Data 27C may, for example, be obtained by measuring light output by pixels of reference monitor 18 for different inputs. Data 27C may, for example, be provided in the form of a lookup table or other suitable data structure.

Block 27D compares simulated light output of reference monitor 18 to image data 21 and outputs data 27E that indicates any pixels that are clipped when image data 21 is displayed on reference monitor 18. Data 27E may optionally be input into block 25. Block 25 may format data 27E for display as described elsewhere herein.

In some embodiments, reference monitor 18 is a dual modulation display (for example a local dimming display). Such displays typically include a spatial amplitude modulator having controllable pixels and one or more light sources that deliver light for modulation by the spatial amplitude modulator. Dual modulation displays include some mechanism for controlling the amount of light incident on pixels of the spatial amplitude modulator according to image data 21 so that, in general, more light is incident on pixels for which image data 21 specifies higher luminance and less light is incident on pixels for which the image data 21 specifies lower luminance.

Where reference monitor 18 is a dual modulation display, module 27 may emulate one or both of an algorithm performed by reference monitor 18 to control the amount of light incident on each pixel of a spatial amplitude monitor based on image data and an algorithm performed by reference monitor 18 to control the pixels of the spatial amplitude monitor based on the image data. Module 27 may also estimate the amount of light incident at each pixel of the spatial amplitude monitor. The result of these computations may be combined to yield an estimate of the luminance of each pixel of the image displayed by reference monitor 18 for each colour channel. Specifics of these calculations will depend on the specific design of reference monitor 18.

In some embodiments, reference monitor 18 is a light steering display. Light steering is a technology that selectively steers light from a light source to pixels of a display based on image data. A light steering display may be implemented as a dual modulation display.

Various mechanisms for light steering are possible. For example, light steering may be performed by controlling pixels of a phase modulator to alter phases of light from a light source according to a phase pattern such that interaction of the phase altered light cause the light to be concentrated (higher luminance) in certain areas of an image and reduced (lower luminance) in other areas of the image. Light steering technologies are described for example in the following published PCT patent applications: WO 2015/054797 A1 entitled LIGHT FIELD PROJECTORS AND METHODS; WO 2015/172236 A1 entitled OPTIMIZING DRIVE SCHEMES FOR MULTIPLE PROJECTOR SYSTEMS; WO 2015/184549 A1 entitled EFFICIENT, DYNAMIC, HIGH CONTRAST LENSING WITH APPLICATIONS TO IMAGING, ILLUMINATION AND PROJECTION; WO 2016/015163 A1 entitled NUMERICAL APPROACHES FOR FREE-FORM LENSING: AREA PARAMETERIZATION FREE-FORM LENSING; WO 2017/059537 A1 entitled PROJECTION SYSTEMS AND METHODS; and WO 2018/205036 A1 entitled HIGH BRIGHTNESS PROJECTION SYSTEMS AND METHODS and the following paper: Gerwin Damberg, Ronan Boitard, Anders Ballestad, Wolfgang Heidrich Light Steering Projection Systems and Attributes for HDR Displays SID 2017 International Symposium, Volume 48, Issue 1, May 2017 Pages 87-90, https://doi.org/10.1002/sdtp. 11574.

In FIG. 4, module 27 includes a part 27F that simulates operation of a light steering system of reference monitor 18. Part 27F may, for example, include the same processing that is used to generate control signals for light steering hardware of reference monitor 18 and pass the resulting control signals to a computational simulation of the operation of the light steering hardware to yield an estimated light field produced by the light steering hardware. The computational simulation may include separate simulations for different colour channels.

For example, reference monitor 18 may include light steering hardware that includes a spatial phase modulator (e.g. a device comprising a 2D array of pixels that are each controllable to alter a phase shift applied to incident light). For example, the phase modulator could be provided by a liquid crystal on silicon (LCoS) phase modulator. Part 27F may model an optical path of the light steering hardware including the phase modulator to generate the estimated light field.

The estimated light field may be used to estimate luminance of pixels in the image displayed by reference monitor 18 per colour channel.

In some embodiments, part 27F includes a light-steering light budget calculator. A light steering system may be capable of providing very high luminance on a certain proportion of the area of an image. However the light steering system may not be capable of delivering enough light to achieve the same very high luminance over a larger proportion of the area of the image. The light-steering light budget calculator may process image data 21 (with any preprocessing) to estimate the required light output that a light steering system of reference monitor 18 would be required to deliver in order to accurately render the image specified by image data 21.

Light steering simulation 27F may compare the estimated required light output of the light steering system to a stored value 27G that represents the light output that the light steering system is capable of providing and may generate an output indicative of whether or not the estimated required light output exceeds the light output represented by value 27G.

In some embodiments display simulation 22 provides an output that graphically and/or numerically compares the magnitudes of the estimated required light output and the light output represented by value 27G. This output may be displayed to a user of apparatus 10.

In some embodiments reference monitor 18 has a total light budget that is insufficient for driving all pixels at a maximum intensity at the same time. Depending on the architecture of reference monitor 18 the light budget may, for example, arise because one or more of: a power supply of reference monitor 18 has a maximum output power level that is less than a power required to drive all pixels at maximum luminance; reference monitor 18 has a heat dissipation capacity that is insufficient to allow operation above the light budget without overheating; or the light budget is deliberately limited to extend lifetimes of components of reference monitor 18.

Where reference monitor 18 has such a total light budget, module 27 may include a part 27J that processes image data 21 to obtain an estimate of the total light output and/or the power required to display an image defined by image data 21. Part 27J may compare the total light output to a maximum light budget 27K for reference monitor 18 and/or compare a power estimate corresponding to the total light output to a stored value indicating the maximum output power level of reference monitor 18. If the total light output exceeds the light budget and/or the power estimate equals or exceeds the maximum output power level then simulation 22 may take this into account in estimating the light output of pixels of reference monitor 18.

Reference monitor 18 responds to situations where the light budget is exceeded (e.g. because the power required to display an image defined by image data 21 is greater than the maximum output power level of reference monitor 18), by reducing luminance of some or all pixels. Which pixels are affected and by how much the luminance of such pixels is changed relative to the luminance specified by image data 21 may vary depending on the magnitude of the difference between the power required to display an image defined by image data 21 and the maximum output power level of reference monitor 18 and will depend on details of construction of reference monitor 18.

In some embodiments part 27J includes a computational simulation that models how reference monitor 18 responds in such cases and outputs an estimate of the actual luminance of pixels displayed by reference monitor 18 rendering image data 21. The estimate of the actual luminance of the displayed pixels may be compared to image data 21 to identify clipping and/or crushing as described herein.

In some embodiments display simulation 22 provides an output that graphically and/or numerically compares the magnitudes of the estimated required light output and the light output represented by value 27K. This output may be displayed to a user of apparatus 10.

Any of the same approaches applied above to detect and provide information regarding clipping may also be used to detect and provide information regarding crushing except that instead of making a comparison and determining that image data 21 specifies a luminance that is greater than reference monitor 18 is displaying (as for detecting clipping) a comparison may be made to determine that image data 21 specifies a luminance for a pixel that is lower than reference monitor 18 is displaying for detecting crushing.

In some embodiments module 27 is connected to receive as inputs data from locations internal to reference monitor 18 and reference monitor 18 is configured to supply such internal data to module 27. This may simplify construction of module 27 and may be particularly convenient if reference module 27 is incorporated in reference monitor 18. For example, part 27A may be unnecessary if module 27 has access to image data that has been modified by processing in reference monitor 18.

In some embodiments, apparatus 10 is configured to perform one or more of:
  Providing a feedback loop to colour grading console 16 (e.g. by way of metadata) to indicate how pixels have been rendered by reference monitor 18. Colour grading console 16 may be configured to apply the feedback to correct image data 21 to reflect the image as rendered by reference monitor 18.
  Create and deliver the reference master (optionally by modifying image data 21 to reflect the images actually rendered on reference modulator 18).

Providing metadata to colour grading console 16 such as: a map or mask (e.g. an Alpha matte) identifying pixels with issues (such as crushing or clipping); metadata which includes input values recognized by colour grading console 16 to perform a dedicated action/transformation. The map or mask may illustrate light distributions (e.g. a cost of the light being used relative to the light budget). The map or mask is preferably displayed without impacting the light budget.

Figure 5A:
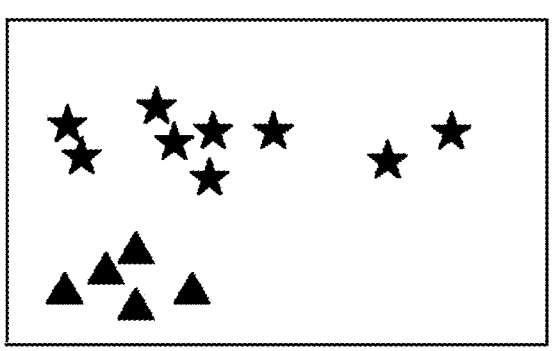
FIGS. 5A, 5B and 5C are schematic illustrations showing example displays that may be provided to indicate clipping and/or crushing in frames of digital content.
Figure 5B:
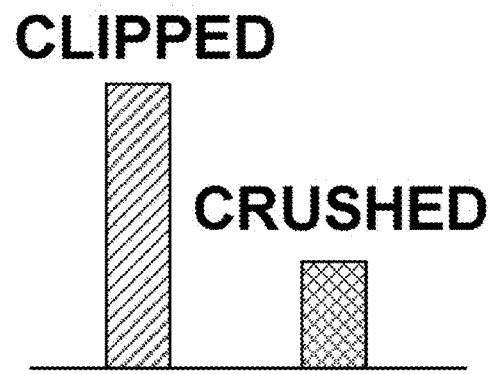
Figure 5C:
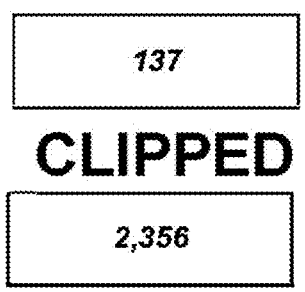

FIGS. 5A, 5B and 5C illustrate example displays that may be provided by apparatus 10 for indicating clipping and/or crushing to a colourist. FIG. 5A is a map which indicates location of clipped pixels (stars) and crushed pixels (triangles). In some embodiments different symbols and/or colours are used to represent data corresponding to different colour channels (e.g. red stars for clipped red pixels, green stars for clipped green pixels, blue stars for clipped blue pixels). In some embodiments white symbols are used to represent pixels which are clipped or crushed in two or more colour channels. FIG. 5B is a bar chart that indicates numbers of clipped and crushed pixels in an image. In some embodiments a bar chart is displayed for each colour channel (e.g. a bar chart showing clipped or crushed red pixels, a bar chart showing clipped or crushed green pixels and a bar chart showing clipped or crushed blue pixels). In some embodiments bar charts corresponding to different colour channels are superimposed over one another. FIG. 5C is a numeric display that indicates number of clipped and crushed pixels in an image. In some embodiments the numeric display shows the number of clipped and/or crushed pixels per colour channel. Two or more of the example data visualizations that are illustrated in FIGS. 5A, 5B and 5C and described herein may be displayed simultaneously. In some embodiments apparatus 10 includes controls that allow a colourist to select which information is displayed and/or how that information is displayed.

Figure 6:
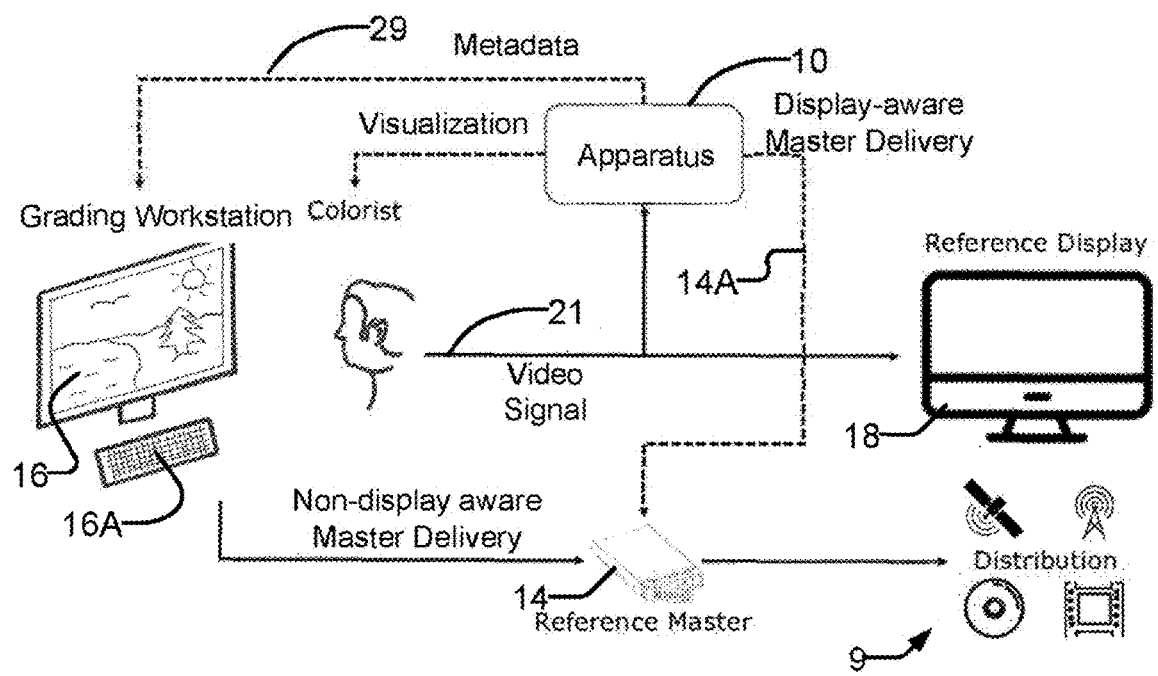
FIG. 6 is a schematic illustration of apparatus for colour grading according to an example implementation.

FIG. 6 illustrates a possible workflow for apparatus 10 as described herein. Signal 14A represents a modified version of image data 21 that represents the actual image rendered by reference monitor 18. Signal 14A may be used to provide a reference master 14 (which may be used to generate various distribution formats 9). Signal 29 carries feedback information to colour grading console 16. The feedback information may be provided to a colourist on a display that is part of console 16 or on another display. Signal 29 may, for example, carry information regarding clipping and/or crushing (e.g. information that can be depicted as illustrated in any of FIGS. 5A to 5C) or any other information that may be delivered for informing a colourist as described herein.

In some embodiments, apparatus 10 is configured to detect and identify to a user any pixels that could be made brighter without significant impact on the amount of light used to display an image.

Emulated Rendering

As discussed above, for some content (e.g. high profile movies) it is typical to generate two or more different reference masters (or "formats"). Each of the reference masters may be intended for viewing on displays having a certain level of performance (e.g. having certain specifications for dark level, dynamic range, maximum pixel luminance, resolution, etc.) in a certain type of viewing environment (e.g. cinema theater, home living room, etc.). Each reference master may store image data in a suitable corresponding video format. For example, for a certain item of content each of: a cinema master, a home master, an HDR home master, a master for mobile viewing, and perhaps others may be created.

The different formats used for storing image data in different reference masters may require different video signals, either because the standard way of transmitting pixel information is different (e.g. cinema versus home, 8 versus 10 bits, High Definition (HD) versus Ultra High Definition (UHD), 4:2:0 versus 4:4:4 chroma subsampling) or because the assumed performance levels of the displays on which the content will be rendered are significantly different (e.g. HDR versus SDR).

Colour grading for each reference master could be done as a separate project using a corresponding matching reference monitor. This approach has the benefit of optimizing colour grading of each reference master for the corresponding distribution channel. However, this approach has the problems that it is very labour intensive (expensive) and requires use of multiple reference monitors (which is expensive, requires space and introduces technical complications) and also incurs the risk that different reference masters may not be consistent (i.e. different decisions in colour grading for the different reference masters may not preserve a desired artistic effect across the different reference masters).

Some colour grading workflows use "trim passes" to generate some reference masters. In this approach, colour grading for a first format is performed first and the colourist subsequently colour grades for other formats by modifying or "tweaking" the colour graded image data from the first format for display on reference displays corresponding to the other formats. This approach can save time and can help to achieve consistency between the different formats. However, using trim passes can have drawbacks including:

- A linear approach is required. Reference masters for other formats cannot be prepared until colour grading of the first format is complete.
- It is complicated to propagate changes from the first format to other formats after the trim passes have been done-any modification to the first format would need to be re-validated and then propagated to all of the other formats.
- A large amount of data storage may be required for all different versions of the projects and masters. The large amount of stored data may make it difficult to keep track of where various formats are saved, complicate archiving, backing-up and/or delivery of the data, etc.
- Trim pass versions are typically somewhat constrained to creative choices made in colour grading the first format.
- Trim pass versions often do not fully apply the capabilities of the corresponding reference displays.

In some embodiments, apparatus 10 is configured to one or both: facilitate colour grading for plural distribution channels (plural formats) primarily using a single reference monitor; and perform colour grading in a way that allows plural reference masters for different distribution channels to be based on colour grading done for one distribution channel. Application of either or both of these features may save significant costs and time.

In some embodiments data processor 12 is configured to predict the appearance of an item of content when image data for the content is rendered on a particular type of reference monitor (a target reference monitor). The prediction may, for example, be generated by a computational simulation of the target reference monitor. The computational simulation may, for example, be performed as described elsewhere herein. The result of the computational simulation may be modified image data. The modified image data is displayed on reference monitor 18.

Where reference monitor 18 has capabilities that are at least equal to those of the target reference monitor, the appearance of the images displayed on reference monitor 18 using the modified image data will be very close to the appearance of displayed images on the target reference monitor using the original image data.

Where reference monitor 18 has capabilities that are less than the capabilities of the target reference monitor, the appearance of the images displayed on reference monitor 18 using the modified image data may be very close to the appearance of displayed images on the target reference monitor using the original image data except for the pixels that have values (e.g. luminance values) which lie outside of the reference monitor's capabilities (i.e. outside of a performance envelope of the reference monitor). In such a case a colourist may still review the accurately displayed pixels while igorning non-accurately displayed pixels (e.g. clipped/crushed pixels). The non-accurately displayed pixels may, for example, be identified and/or displayed using a map, mask or otherwise visualized as described elsewhere herein.

Data processor 12 may be configurable to perform simulations for several different target reference monitors. This allows system 10 to be used to at least perform preliminary colour grading for several different reference masters all with reference monitor 18. Reference monitor 18 may, for example, comprise a portable display.

For selected content final colour grading and validation (QC) for each reference master may be performed using the corresponding target reference monitors.

Providing emulation of different reference monitors allows apparatus 10 to be used to complete or at least to complete the bulk of colour grading for two or more formats without the need to access different reference monitors.

In some embodiments, apparatus 10 is configured to perform automatic translation of grades across plural formats. This feature may be applied to enable a single grading workflow for all reference masters.

Figure 7:
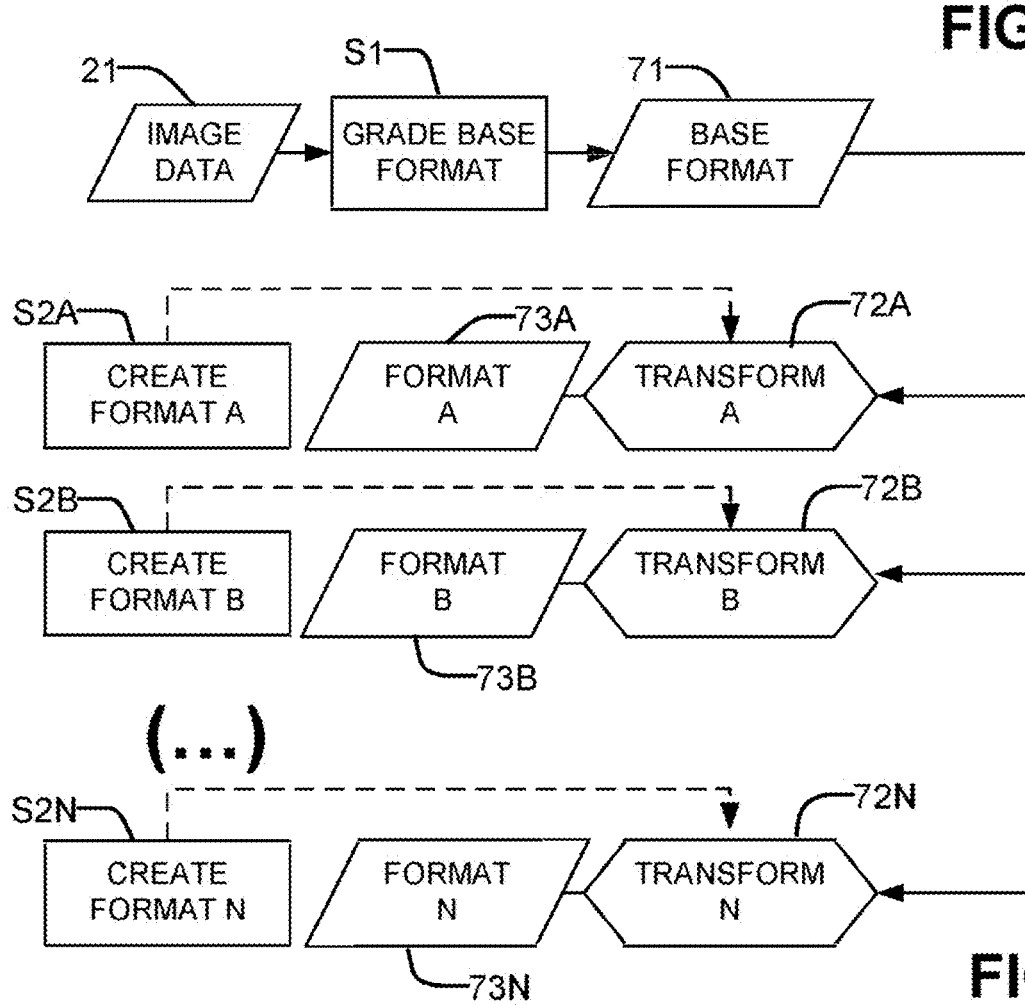
FIG. 7 is a combined flow chart and data flow diagram illustrating an example method for colour grading content for a plurality of formats.

FIG. 7 is a combined flow chart and data flow diagram that illustrates an automatic grade translation method according to an example embodiment. In block S1 colour grading is performed for a base format. Block S1 processes image data 21 to yield base format data 71.

The base format may but does not necessarily correspond to any reference master that will be produced. Preferably the base format is an HDR format so that HDR information in image data that is colour graded for the base format implements a desired artistic intent.

Each of blocks S2A through S2N corresponds to a format and applies a corresponding transformation respectively 72A to 72N (collectively or generally transformations 72) to base format data 71 (i.e. to image data that has been colour graded for the base format) to yield a respective version of the image data 73A to 73N that has been colour graded for the corresponding format.

Steps S2A to S2N may be performed in any order or concurrently. Further, Step S1 may be performed incrementally for different parts of image data 21 (e.g. the colourist may colour grade for the base format one clip at a time). Steps S2A to S2N may be performed incrementally together with step S1.

The colourist may view the results of transformations 72A to 72N on one or more reference monitors during or after colour grading for the base format. Here, various options are possible. These include:

Data processor 12 may perform a transformation from the base format to another format and cause reference monitor 18 to emulate a corresponding reference monitor as described herein. The colourist may view the resulting images on reference monitor 18. Apparatus 10 may include a control that the colourist can operate to switch among different formats/emulated reference monitors.

Data processor 12 may perform transformations from the base format to one or more other formats. Apparatus 10 may include reference monitors corresponding to each of the one or more other formats. The colourist can view the images for each of the one or more other formats on the corresponding reference monitor.

Data processor 12 may output image data in the base format to one or more reference monitors and the one or more reference monitors may be configured to transform the image data from the base format to another format for viewing on the reference monitor(s). In some implementations a separate reference monitor is provided for each of two or more other formats and each reference monitor is configured to transform image data from the base format to a corresponding other format. In some embodiments a reference monitor is configured to selectively transform the image data from the base format to one or two or more other formats.

The colourist may adjust colour grading in the base format and/or adjust parameters for transformations 72 until the transformed image data for all of the other formats is acceptable.

In some embodiments apparatus 10 includes controls that allow the colourist to tune the transformations from the base format to one or more of the other formats. Such controls may be used to take full advantage of the capabilities of a reference display for any of the other formats while achieving a desired artistic effect.

For example, a transformation 72 may be defined by some or all of the following parameters:

Diffuse white: to which luminance value "diffuse white" is mapped. "Diffuse white" means a luminance threshold at which an object seems to reflect light rather than emit light. In image application, "diffuse white" typically refers to the white point/light level where only specular highlights have higher luminance values. "Specular highlights" means bright spots of light that appear on shiny objects when illuminated. Specular highlights are typically but not necessarily small while diffuse light can cover larger areas/surfaces.

Peak luminance: the peak luminance of the targeted format.

Black level: black level of the targeted format.

Inflection points in shadows and highlight: threshold value at which luminance values are rolled in for shadows and highlights.

Figure 8:
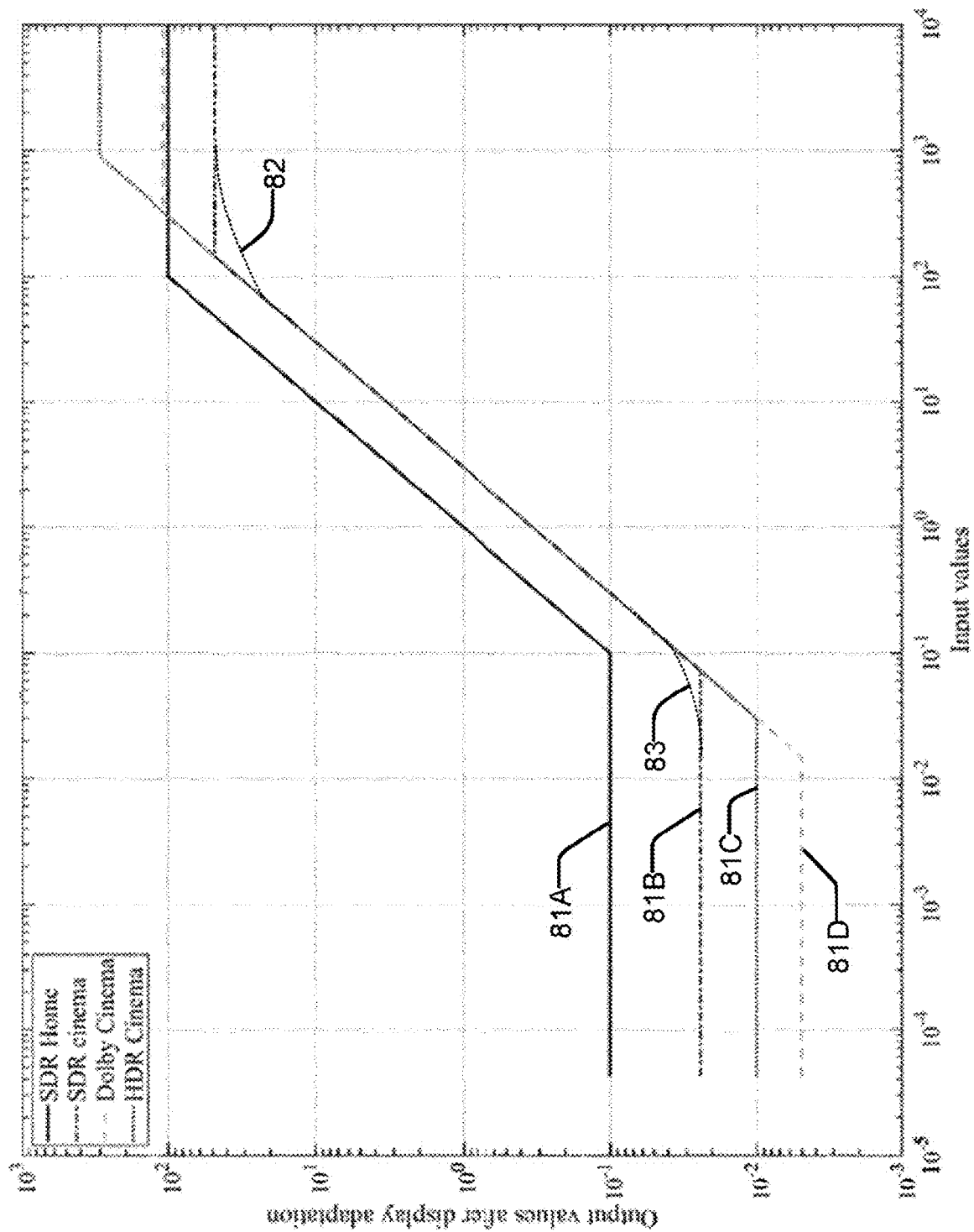
FIG. 8 is a graph that illustrates example transforms between different formats.

FIG. 8 shows curves that may be used to define simple example transformations from a base format (in this case HDR Home) to several other formats (SDR Home—curve 81A, SDR Cinema—curve 81B, HDR Cinema—curve 81C and Dolby™ Cinema—curve 81D). In this example, ambient illumination compensation is performed using a linear scaling (diffuse white is scaled by 3) and different display capabilities (black level and peak luminance) are handled by hard clipping. Transformations 81A to 81D do not include any rolling of the shadows/highlights. FIG. 8 illustrates an example rolling of highlights applied to transform 81B at 82 and an example rolling of shadows applied to transform 81B at 83. The transforms illustrated in FIG. 8 are examples only. Transforms may be linear or non linear.

Upon completion of colour grading for the base format, image data 73 for each of the other formats can be automatically generated using the corresponding transform 72 and provided as a reference master.

Selected or used transforms may be delivered as (or stored in) metadata. The metadata may be delivered per frame, per clip, for an entire item of content, etc. Metadata may be delivered for each of the different formats.

In some embodiments the transformations 73 from base format 71 to each other format convert from a colour space of the base format to a colour space of the other format and also convert from a transfer function of the base format (i.e. a function that relates a pixel value or "code value" to luminance) to a transfer function of the other format. Such transformations may, for example be implemented as 1D lookup tables, 3D lookup tables, deterministic equations and/or spatial processing algorithms.

Figure 9A:
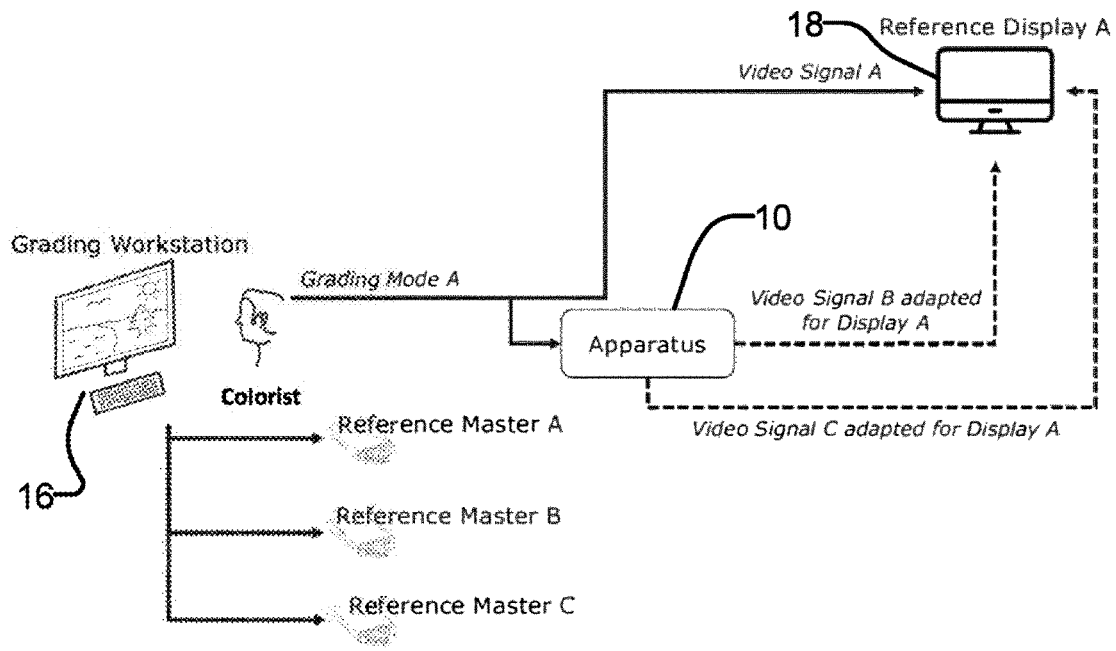
FIGS. 9A to 9D are schematic illustrations showing apparatus for colour grading according to several example implementations.

FIG. 9A illustrates an example apparatus 10 in which a reference monitor 18 is used natively as a reference monitor for a format "A" and processor 12 provides modified image data to allow reference monitor 18 to emulate reference monitors for formats "B" and "C".

Figure 9B:
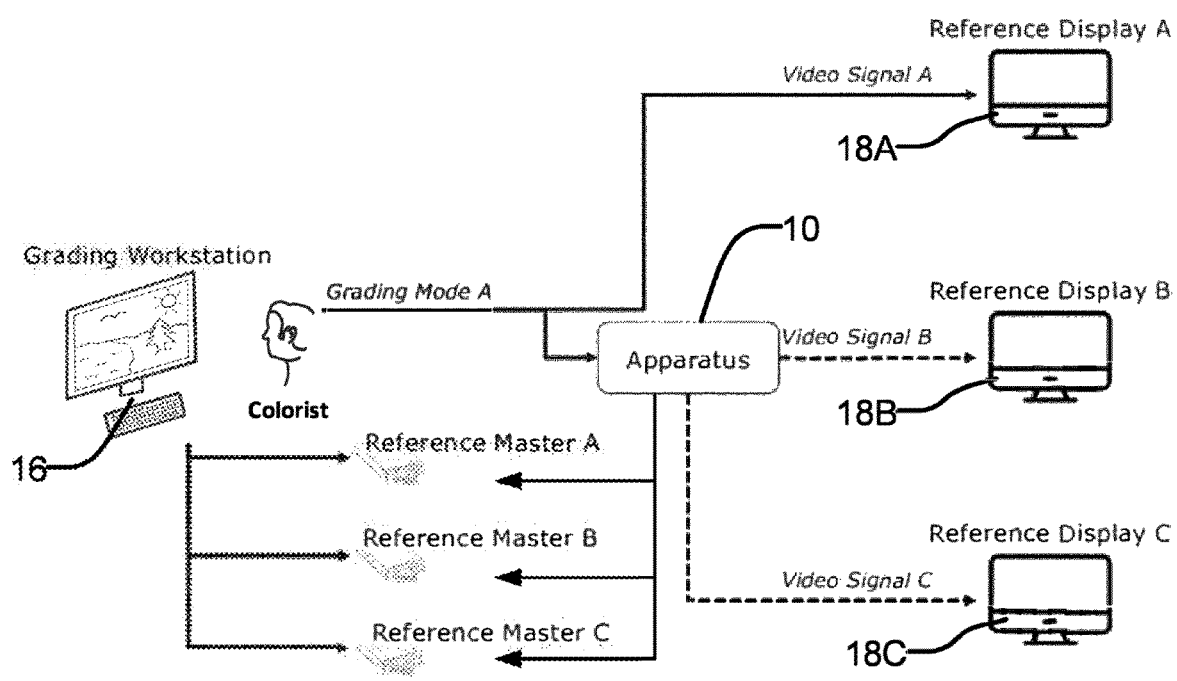

FIG. 9B illustrates an example apparatus 10 that is similar to the apparatus of FIG. 9A except that separate reference monitors 18A, 18B and 18C are respectively provided for viewing formats A, B and C. Reference masters for formats A, B and C may be created by colour grading console 16 and/or data processor 12.

Figure 9C:
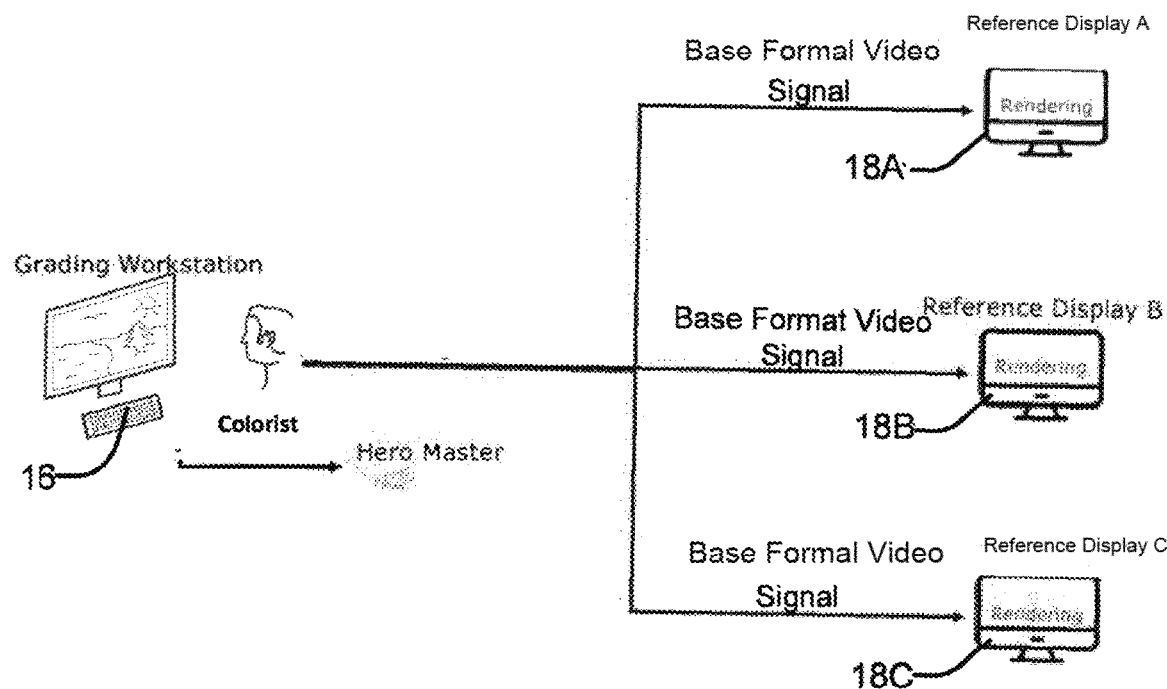

FIG. 9C illustrates an example apparatus 10 in which reference monitors 18A, 18B and 18C each include or are used together with transform processing which transform a base format video signal into other formats. The colourist can operate colour grading console 16 to grade the base format while viewing resulting images for formats A, B and C on reference monitors 18A, 18B and 18C respectively. A reference master may be created in the base format (and subsequently transformed to other formats) and/or separate reference masters may be created for different formats.

Figure 9D:
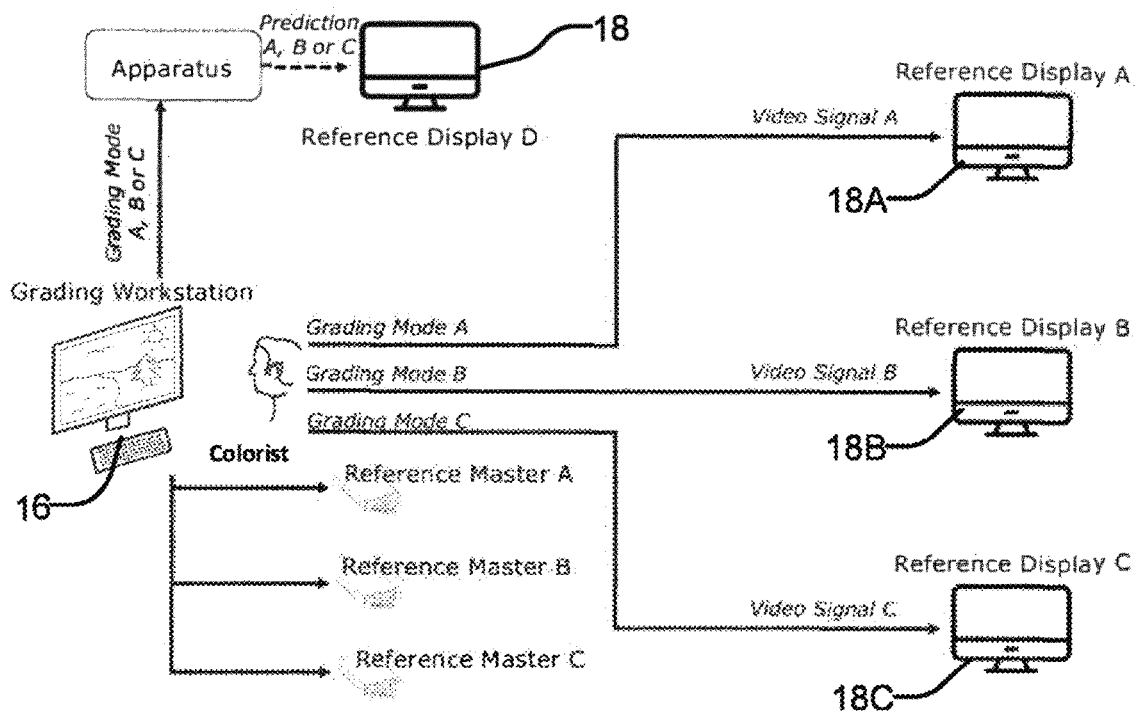

FIG. 9D shows an apparatus similar to that of FIG. 9C except that the apparatus includes reference displays 18A, 18B and 18C as well as reference display 18 which may be operated to emulate any or all of reference displays 18A, 18B and 18C. Most of the work of colour grading for formats A, B and C may be performed using reference display 18. Reference displays 18A, 18B and 18C may be brought in and used for final colour grading of formats A, B and C respectively.

Temporal Tracking

An item of content may contain many thousand individual frames. For example, at 24 frames per second, one hour of content includes 86,400 frames. At higher frame rates even more frames are required for each hour of content.

A colourist needs to pay attention not only to individual frames but to the experience created when those frames are played back. Temporal effects such as flickering may present problems even if each individual frame is "perfect" when taken on its own.

In some embodiments, apparatus 10 includes a data analyzer 50 (see e.g. FIG. 1) that is configured to process image data to collect data regarding each frame of a set of frames of an item of content. The set of frames may, for example, be all frames in the content, a selected range of frames, all frames in a clip or a group of clips, etc.

The collected data for each frame is stored in a database 52. In database 52, the collected data (which may include data of several types) is associated with the frame from which the data was collected. An individual frame may be identified, for example, by a time code, a frame index number, or the like. Database 52 may also associate individual frames with scenes.

The collected data may, for example, include one or more of:
  min, max, mean and median value of each color channel (e.g. R, G and B) separately, min, max, mean and median value of a measure of brightness (e.g. Y tristimulus value) and maxRGB (e.g. maximum value across all color channels);
  percentage or number of pixels clipped and pixels crushed;
  proportion of light budget required (or a measure of total light output) on a per-colour channel basis and/or a total basis (for displays that have light budgets);
  flags or counters that indicate the presence of defects such as dead pixels, suspected glint defects, and/or suspected compression artifacts;
  histograms (numbers of pixels of frame as a function of luminance or another color value);
  noise level;
  etc.

Data analyzer 50 and/or database 52 may be integrated with data processor 12 or other components of apparatus 10 if desired. In some embodiments data analyzer 50 performs analysis of frames of an item of content on its own schedule (e.g. overnight).

The collected data may be processed for various purposes including any one or any combination of two or more of:
  detecting temporal effects such as flicker in one or more colour channels;
  automatically identifying frames that warrant priority attention by a colourist;
  generating and displaying graphical indicators (e.g. scopes) that show how selected statistics vary temporally in an item of content (e.g. to follow the evolution of a given metric across time);
  computing statistics (e.g. average, mean, maximum, minimum of some value) over a shot or a scene;
  comparing statistics for different frames;
  calculating and/or comparing average statistics for different sets of frames;
  detecting scene clips;
  associating clips corresponding to similar visual stimulus (e.g. outdoor scenes, headshot, etc.).

In some embodiments, database 52 also stores and associates with frames information generated by processing the collected data and/or other information associated with a frame. The processing may be performed by data processor 12, a separate processor associated with database 52 and/or a processor of colour grading console 16. The associated information may, for example, include one or more of:
  flags that indicate ends of clips;
  flags that indicate frames that should be prioritized for a colourist's attention;
  bookmarks set by a user;
  an aggregate amount of time that has been spent grading each frame/clip.

Database 52 may include a search function that enables a colourist to easily find frames that meet certain criteria (e.g. frames that have a similar black level, maximum luminance, average luminance, in a particular clip, etc.).

Database 52 may include a sort function that allows a set of frames (e.g. a set of frames which is the result of a search of database 52) to be sorted in a desired order.

Apparatus 10 may include controls that invoke the search and sorting functions to identify frames of particular interest to a colourist. For example, apparatus 10 may provide controls (e.g. by interface 16A of colour grading console 16) that cause database 52 do one or more of:

- identify for the colourist N frames (N can be 1, 2, 3, . . . ) in each clip that have the greatest numbers of clipped pixels;
- identify for the colourist N frames (N can be 1, 2, 3, . . . ) in each clip that have the greatest numbers of crushed pixels;
- identify for the colourist frames that have suspected compression artefacts;
- identify for the colourist frames that have dead pixels;
- identify for the colourist frames that have suspected glint defects;
- identify for the colorist frames that are similar to one another or similar to a currently selected frame in some way (e.g. they have similar black level, similar average luminance, similar maximum luminance, etc.);
- etc.

Apparatus 10 may provide controls that allow a colourist to efficiently perform colour grading functions. Such controls may, for example, be provided by user interface 16A. For example, one control may allow the colourist to jump between frames that have been identified as having the greatest numbers of clipped pixels in individual clips. The colourist may address clipped pixels by applying tone mapping to reduce the luminance of pixels in frames of the clip so that the clipping is reduced or eliminated. Since the tone mapping may be applied to all frames of a clip, addressing clipping in the frame of the clip that has the most clipped pixels is likely to ameliorate any clipping issues in all frames of the clip.

Another example control may be provided to allow the colourist to jump between and or compare (by displaying simultaneously) frames that have similar characteristics (e.g. similar average luminance, similar contrast, etc.). The colourist may use this tool to check for consistency between different clips for which a similar feel is desired.

Another example control may be provided to allow the colourist to jump between frames that may be affected by certain types of defects such as: dead pixels, glint defects, compression artefacts, etc. In some embodiments the control is configured with a selection tool that allows the colourist to select which defect(s) to include. The colourist may use such a control to quickly find frames that require adjustment to correct various types of defects.

In some embodiments apparatus 10 is configured to display metrics in a temporal context (e.g. displaying metrics for a range of neighboring frames and the current frame). This helps the colorist to understand the evolution of the displayed metrics across time, as well as to spot single-frame errors. Such displays may, for example, be provided as part of user interface 16A.

In some embodiments apparatus 10 is configured to display high-level metrics aggregated from multiple frames. Such high-level metrics may include (but are not limited to) average luminance in a shot, average contrast in a shot, maximum frame light level over all or parts of the image data, etc. These high-level metrics may help the colorist to detect in real-time complex problems in the video signal that would otherwise be very hard to detect. For example, a colourist using apparatus 10 may be able to easily monitor consistency of the high level metrics over a given period of time, for example, by comparing several similar (e.g. same peak luminance or color gamut or black level, etc.) frames to ensure consistency. High level metrics may, for example be computed by data analyzer 50 in the course of analyzing frames of an item of content or subsequently using data from database 52.

In some embodiments apparatus 10 is configured to display a timeline that graphically shows the magnitude of one or more such high-level metrics for each frame or section of an item of content. By viewing this timeline the colourist may quickly identify inconsistencies in one or more high level metrics.

Figure 10A:
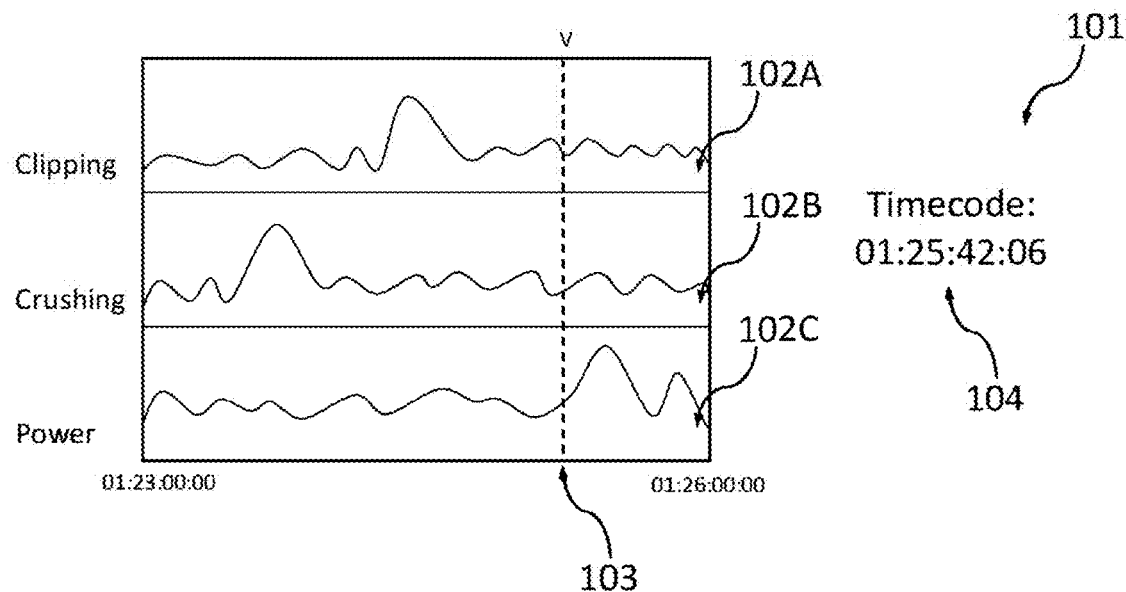

FIGS. 10A through 10D show examples of different ways that statistics of individual frames and/or high level statistics may be indicated to a user. FIG. 10A, shows an example display 101 in which timelines 102A, 102B and 102C respectively show temporal variation of clipping, crushing and power. A marker 103 indicates the current frame. A time code display 104 indicates the time code for the current frame.

Figure 10B:
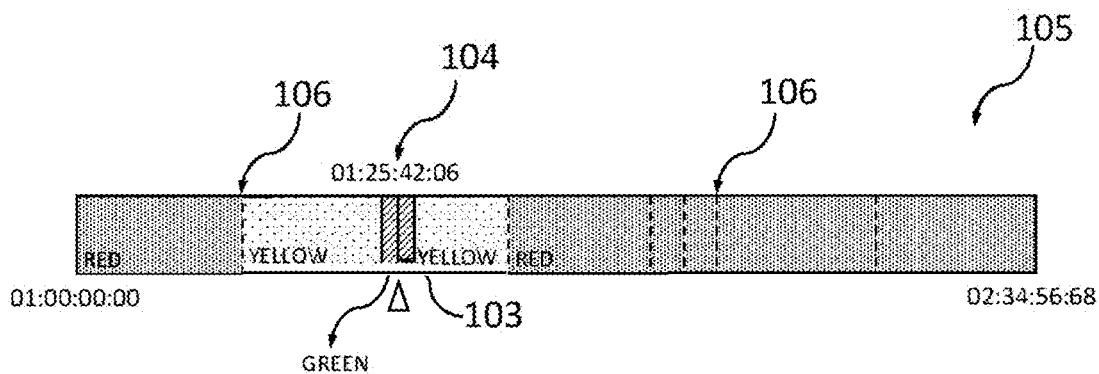

FIG. 10B shows another example display 105 which indicates temporal variation of a parameter (any parameter or metric as described herein) by changes in colour and/or lightness. Marks 106 indicate clip boundaries. Different colours, symbols, etc. may be used to indicate a comparison of a current value of a parameter or metric to the display's capabilities. For example, green may indicate that luminance values are within the display's capabilities, yellow may indicate that luminance values are close to a maximum of the display's capabilities and red may indicated that luminance values have exceeded the maximum luminance the display can support and clipping is occurring.

FIG. 10C shows another example display 108 in the form of a timeline in which each frame is indicated by a symbol 109 (in this example a spot). Symbol 109 may include a component that indicates characteristics of the corresponding frame. For example, symbol component 109A (in this example a vertical line) may indicate that a frame has some quality control issue. Other symbol components may be displayed to indicate other characteristics of the frame. For example symbol components 109B may indicate that the frame includes more than a threshold amount of clipping and symbol components 109C may indicate frames that should be prioritized for colour grading. As colour grading progresses fewer and fewer frames will be marked by symbol components that indicate problems with the frame.

FIG. 10D shows another example display 110 in the form of a graph 111 that shows temporal variation of a metric (e.g. any metric or parameter value that is associated with a frame). Display 110 may include indicia 112 indicating one of more thresholds. Shading, colouring or highlighting 113 may be provided to emphasize frames for which the metric exceeds a threshold.

Displays such as those shown in FIGS. 10A to 10D may be provided individually or in any combination in apparatus 10. Such displays may, for example, be provided on user interface 16A or another display that may be included in apparatus 10. The displays may be dynamically updated as grading progresses.

Grading Assistant

In some embodiments, apparatus 10 is configured to automatically generate information and suggestions that may help to optimize the use of a colourist's time. Examples include:

- An item of content such as a full movie may be analyzed as described above and apparatus 10 may suggest (or automatically select) a frame in each clip that the colourist should start with when grading the clip.
- For a clip or other set of frames, apparatus 10 may be configured to generate and present suggested adjustment(s) to correct one or more issues. For example apparatus 10 may be configured to:

generate a scaling factor or tone mapping parameter or tone mapping function that will bring clipped and/or crushed pixels within range;

generate one or more scaling factors or tone mapping parameters or tone mapping functions selected to make two or more selected clips more consistent with one another (e.g. in terms of characteristics such as average luminance, colour balance, contrast, or the like).

Apparatus 10 may suggest key frames for grading dynamic behavior.

Apparatus 10 may generate the information and/or suggestions for example by processing data in database 52. For example apparatus 10 may be configured to search database 52 to identify which frame in each clip appears to require the most significant tone mapping (e.g. by finding the frame in each clip that has the largest number of clipped and/or crushed pixels). In this case, apparatus 10 may also configure a suggested tone mapping function to bring each of the clipped and/or crushed pixels in range. A colourist may choose to start with the suggested tone mapping function and tweak the suggested tone mapping function as necessary to achieve an artistic intent.

In some embodiments apparatus 10 is configured to make a record of changes that a colourist makes while colour grading an item of content. The record of changes may be stored as metadata in database 52 or another data store. The metadata may be applied, for example, to automate future colour grading of the same or other content. For example, if a colourist has already performed colour grading of two formats for a specific item of content (e.g. HDR Home and SDR cinema), apparatus 10 may predict how the colourist would colour grade another format of the same content.

For example, where one already graded format has a higher dynamic range from another already graded format, apparatus 10 may determine the extent to which the colourist exploited the higher dynamic range for a particular clip (e.g. by comparing statistics from database 52 such as maximum luminance, minimum luminance and average luminance for the already graded formats). In some embodiments, apparatus 10 determines on a scale the extent to which the colourist has exploited the dynamic range in the already graded formats.

For example, if the statistics match (the colourist has not exploited the higher dynamic range available in one of the formats) apparatus 10 may propose colour grading for the corresponding clip for an additional HDR format that does not fully exploit the dynamic range of the additional HDR format.

As another example, if the statistics analyzed show that the grading of the previously graded higher dynamic range format has a significantly higher maximum luminance and/or a significantly higher dynamic range than that of the previously graded lower dynamic range format apparatus 10 may propose colour grading for the corresponding clip for an additional HDR format that does fully exploit the dynamic range of the additional HDR format.

As another example, changes made by a colourist while colour grading an item of content from one format to another format may be recorded (e.g. as metadata). The recorded changes may, for example comprise a transformation or set of transformations applied to implement a grading translation from one format to another, including any adjustments to the transformation(s) that may have been made by the colourist. When the same grading translation is to be applied to a later item of content the recorded changes may be used by apparatus 10 to propose adjustments and/or a transformation or transformations to use for the grading translation of the later content.

Real-Time Quality Control

QC involves checking content for a range of issues. These can include issues such as:

Shooting issues: e.g. objects/people within the field of view of the camera that should not be (e.g., microphone), flicker, black border around picture;

Creative/Perceptual artifacts: e.g. VFX incoherency, Motion judder, wrong transition;

Editing issues: e.g. subtitles overlapping important narrative tools or invisible because of background;

Video Signal issues: e.g. clipping/crushing of content, out of gamut color, dead pixels, etc.

The later QC issues are detected in the production process the more likely it is that correcting the QC issues will cause significant rework. Video signal issues can be particularly likely to be detected late because such issues may be invisible when content is rendered on one display but obvious when the same content is rendered on another display. Similarly, video signal issues can exist in some formats but not others.

In some embodiments, apparatus 10 is configured to automatically review content for selected QC issues. Apparatus 10 may analyze each frame for a range of selected QC issues and may communicate those issues in any of various ways. For example, a QC analysis may be presented to a colorist by one or more of:

direct visualization feedback indicating frames with QC issues;

a printed report describing the QC issues and the timecode at which they appear;

a metadata file enabling import of markers that indicate QC issues into grading software;

across grade: indicate that a grade different from the one being reviewed might have issues and should be reviewed to make sure it is not a problem;

real-time compression of image to assess if QC issues will arise once content is encoded+decoded using the desired distribution codec.

Some QC issues relating to the video signal may be detected as described elsewhere herein (e.g. dead pixels, crushing, clipping, exceeding a light budget, etc.). In some embodiments apparatus 10 includes a feature recognition module 54 (e.g. a trained machine learning system) (see e.g. FIG. 1) that is trained to recognize objects or other features that might appear in a frame by accident (e.g. microphones, cameras, filmmaking lights, etc.). Feature recognition module 54 may additionally or in the alternative be trained to detect other issues with frames such as glint defects, flare, and other recognizable issues that should be considered as part of QC. Frames identified by feature recognition module 54 as including features of interest may be flagged in database 52. Apparatus 10 may include a control that allows a colourist to review the frames that have been flagged by feature recognition module 54.

Aspects of the technology described herein may also be provided in the form of program products. A program product may comprise any non-transitory medium which carries a set of computer-readable, computer executable instructions which, when executed by a data processor, cause the data processor to execute a method as described herein. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, code for configuring a configurable logic circuit, applications, apps, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Interpretation

"HDR" means high dynamic range. HDR video typically has a dynamic range of 10 stops or more.

"SDR" means standard dynamic range. SDR video typically has a dynamic range of about 6 stops (for 8-bit data) to about 10 stops (for 10-bit data).

"Format" means a version of content destined for a specific distribution. For example, HDR Home, SDR Home, SDR Cinema (traditional Cinema), Extended Dynamic Range (EDR) Cinema (e.g. Dolby Vision™ (DVis)), HDR Cinema. Depending on the context, format may also mean a particular way of storing or representing data.

"Quality Control" or "QC" means a process for verifying the compliance of content before delivery of the content.

"Reference Master" means image data in a delivered format that may be used to create distribution Masters.

"Bit-depth" means a number of bits on which pixel values are quantized. For example 8 bits are used for SDR Home, 10 bits are used for UHD SDR Home or HDR Home, 12 bits are used for many cinema formats and 16 bits may be used for Reference Masters.

"Chroma sampling" (or "chroma subsampling") is the number of samples used to describe a 2×2 pixel matrix. For example, 4:4:4 means 4 samples for each of three channels. 4:2:2 means 4 samples for the first channel, 2 samples for the upper row and 2 for the lower row of the other 2 channels, 4:2:0 means 4 samples for the first channel, 2 samples for the upper row and 0 for the lower row of the other 2 channels.

"Metadata" is information in addition to image content. Metadata may be used for a wide variety of purposes.

"Distribution Master" is a version of content formatted for distribution in a particular distribution channel. A distribution master may have specific characteristics such as colour representation, bit-depth, chroma sampling, data compression, bandwidth, etc. A distribution master may be generated by processing a corresponding reference master.

"Clip"/"shot"/"cut" mean a set of temporally neighboring frames where no scene change occurs. A camera can pan zoom/move during a clip.

"Key-frame" means a frame within a clip that is used to define temporally varying processing. For example a colourist may specify that a particular parameter should vary from a first value at a first key frame to a second value at a second key frame. Associated software may then automatically interpolate the parameter value for each frame between those two key frames.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value ±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;
in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10.

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. An apparatus comprising:
    an input system operative to receive image data for display on a reference monitor;
    a data processor configured to process image data received at the first input to identify differences between an image specified by the image data and a rendering of the image by the reference monitor and to generate difference data representing the differences;
    an output system operative to present the difference data, wherein the data processor is configured to compare the image data to performance characteristics of the reference monitor which define a performance envelope and to determine the difference by identifying pixels of the image data that have pixel values outside of the performance envelope of the reference monitor.

2. The apparatus according to claim 1, wherein the input system is operative to receive from the reference monitor an amplitude signal and the data processor is configured to process the amplitude signal to identify pixels of the image data that are clipped and/or crushed in the rendering of the image by the reference monitor.

3. The apparatus according to claim 1, wherein the data processor is configured to compute a simulated amplitude signal of the reference monitor and to process the simulated amplitude signal to identify pixels of the image data that are clipped and/or crushed in the rendering of the image by the reference monitor, or
    wherein the data processor is configured to simulate operation of the reference monitor to render the image data to yield simulated rendered image data and to identify the differences by comparing the image data to the simulated rendered image data.

4. The apparatus according to claim 3, wherein, in simulating operation of the reference monitor the processor is configured to simulate one or more or all of:
a maximum luminance of individual pixels of the reference monitor;
a dark level of individual pixels of the reference monitor;
processing on the image data performed by the reference monitor;
operation of a power supply of the reference monitor;
thermal management of the reference monitor;
local contrast of the reference monitor;
rate of change of luminance of the reference monitor;
a light steering component of the reference monitor.

5. The apparatus according to claim 3, wherein the differences include clipping and/or crushing by the reference monitor.

6. The apparatus according to any of claim 3, wherein the apparatus is operative to output the simulated rendered data, or wherein the apparatus is operative to store the simulated rendered data, or wherein the apparatus is configured to display the difference data, or wherein the apparatus is configured to display the difference data as an image that indicates locations of pixels that are different from the image specified by the image data in the rendering of the image by the reference monitor, or wherein the apparatus is configured to display the difference data as numerical and/or graphical indicator showing a number of pixels that are different from the image specified by the image data in the rendering of the image by the reference monitor.

7. The apparatus according to claim 6, wherein the indicator indicates a number of clipped pixels relative to a clipping number threshold, or wherein the indicator indicates a number of clipped pixels for which the clipping exceeds a clipping magnitude threshold.

8. The apparatus according to claim 1, wherein the apparatus is integrated with the reference monitor, or wherein the apparatus is integrated with a colour grading console.

9. A colour grading suite comprising the apparatus according to claim 1 in combination with a reference monitor and a colour grading console, wherein the colour grading console is connected to supply the image data to an input of the reference monitor and the input system of the apparatus.

10. The colour grading suite according to claim 9, wherein the colour grading console is configured to display a representation of the difference data on a user interface of the colour grading console.

11. The apparatus according to claim 1, wherein the data processor is configured to identify the differences between the image specified by the image data and the rendering of the image by the reference monitor for each of a plurality of colour channels, or wherein the data processor is configured to either simultaneously or at different times:
simulate operation of one or more other monitors that are different from the reference monitor to render the image data and to yield simulated rendered image data for each of the one or more other monitors; and
output the simulated rendered image data for one of the one or more other monitors for display on the reference monitor.

12. The apparatus according to claim 11, wherein in simulating operation of one of the one or more other monitors the processor is configured to simulate one or more or all of:

a maximum luminance of individual pixels of the other monitor;
a dark level of individual pixels of the other monitor;
processing on the image data performed by the other monitor;
operation of a power supply of the other monitor;
thermal management of the other monitor;
local contrast of the other monitor;
rate of change of luminance of the other monitor;
a light steering component of the other monitor.

13. The apparatus according to claim 1, wherein the apparatus is configured to perform any one or any combination of two or more of:
detect temporal effects such as flicker in one or more colour channels;
automatically identify frames that warrant priority attention by a colourist;
generate and display graphical indicators that show how selected statistics vary temporally in content corresponding to the image data;
compute statistics over a clip, shot or scene;
compare statistics for different frames;
calculate and/or compare average statistics for different sets of frames;
detect clips;
associate clips corresponding to similar visual stimulus.

14. The apparatus according to claim 13, wherein the apparatus is further configured to present a display indicating the temporal effects.

15. The apparatus according to claim 13, comprising controls that invoke the search and sort functions to do one or more of:
identify N frames (N can be 1, 2, 3, . . . ) in each clip that have the greatest numbers of clipped pixels;
identify N frames (N can be 1, 2, 3, . . . ) in each clip that have the greatest numbers of crushed pixels;
identify frames that have suspected compression artefacts;
identify frames that have dead pixels;
identify frames that have suspected glint defects; and
identify frames that are similar to one another or similar to a currently selected frame.

16. The apparatus according to claim 15, wherein the controls are operable by a user to:
jump between frames that have been identified as having the greatest numbers of clipped pixels in individual clips;
jump between and/or compare frames of the image data that have similar characteristics; or
jump between frames of the image data that include defects.

17. The apparatus according to claim 16, wherein the apparatus is configured to compute and display high-level metrics aggregated from multiple frames, or
to display a timeline that graphically shows the magnitude of one or more of the high-level metrics, or
to suggest or automatically select a frame in each of plurality of clips of the image data for initial grading of the respective clip, or
to generate a scaling factor or tone mapping parameter or tone mapping function that will bring clipped and/or crushed pixels in a frame within range, or
to generate one or more scaling factors or tone mapping parameters or tone mapping functions selected to make two or more selected clips more consistent with one another, or to suggest key frames for grading dynamic behavior of the image data, or to automatically each of a plurality of frames defined by the image data for one or more QC issues and to generate and present a QC analysis.

18. The apparatus according to claim 1, comprising a feature recognition module comprising a trained machine learning system that is trained to recognize filmmaking equipment in frames of the image data.

19. An apparatus comprising:

an input system operative to receive image data for display on a reference monitor;

a data processor configured to simulate operation of one or more other monitors different from the reference monitors to render the image data and to yield simulated rendered image data for each of the one or more other monitors and output the simulated rendered image data for one of the one or more other monitors for display on the reference monitor, wherein the data processor is configured to compare the image data to performance characteristics of the reference monitor which define a performance envelope and to determine the difference by identifying pixels of the image data that have pixel values outside of the performance envelope of the reference monitor.

20. The apparatus according to claim 19, wherein the data processor is configured to simulate operation of a plurality of the other monitors.

21. An apparatus comprising:

an input system operative to receive image data for display on a reference monitor;

a data processor configured to process image data received at the first input, a data analyzer that is configured to process the image data to collect data regarding each frame of a set of frames defined by the image data;

a database connected to store the collected data and configured to associate items of the collected data with corresponding ones of the frames of the image data; and an output system operative to present the collected data, wherein the data processor is configured to compare the image data to performance characteristics of the reference monitor which define a performance envelope and to determine the difference by identifying pixels of the image data that have pixel values outside of the performance envelope of the reference monitor.

22. The apparatus according to claim 21, wherein the collected data includes one or more of:

min, max, mean and median value of each color channel separately;

min, max, mean and median value of a measure of brightness;

maxRGB;

percentage or number of pixels clipped and pixels crushed;

proportion of light budget required on a per-colour channel basis proportion of light budget required on a total basis;

flags or counters that indicate the presence of defects;

image histograms; and noise level.

* * * * *